(12) United States Patent
Li

(10) Patent No.: US 11,424,949 B2
(45) Date of Patent: *Aug. 23, 2022

(54) POINT OF ENTRY (POE) SPLITTER CIRCUITRY

(71) Applicant: CommScope Technologies LLC, Hickory, NC (US)

(72) Inventor: Shi Man Li, Mooresville, NC (US)

(73) Assignee: CommScope Technologies LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/100,539

(22) Filed: Nov. 20, 2020

(65) Prior Publication Data

US 2021/0075638 A1 Mar. 11, 2021

Related U.S. Application Data

(63) Continuation of application No. 16/133,678, filed on Sep. 17, 2018, now Pat. No. 10,855,489, which is a continuation of application No. 29/641,575, filed on Mar. 22, 2018, now Pat. No. Des. 859,321.

(60) Provisional application No. 62/584,890, filed on Nov. 12, 2017, provisional application No. 62/559,833, filed on Sep. 18, 2017.

(51) Int. Cl.
*H04L 12/28* (2006.01)

(52) U.S. Cl.
CPC ...... *H04L 12/2898* (2013.01); *H04L 12/2801* (2013.01); *H04L 12/2869* (2013.01)

(58) Field of Classification Search
CPC ............. H04L 12/2898; H04L 12/2801; H04L 12/2869

See application file for complete search history.

(56) References Cited

U.S. PATENT DOCUMENTS

| 3,676,744 A | 7/1972 | Pennypacker |
| 4,459,568 A | 7/1984 | Landt |
| 5,675,300 A | 10/1997 | Romerein |

(Continued)

OTHER PUBLICATIONS

ANTRONIX Brochure, ARPI-2000 Drop Power Inserter, Feb. 2005.
(Continued)

*Primary Examiner* — Nnenna N Ekpo
(74) *Attorney, Agent, or Firm* — Muncy, Geissler, Olds & Lowe, P.C.

(57) ABSTRACT

The present invention is directed to a CATV & MoCA® device, such as a passive, point of entry (POE) splitter or a RF amplifier. In the passive, POE splitter, a resistive splitter network connects plural "MoCA® only" ports, e.g., four, five or eight, to two or more "MoCA® and CATV" ports. The MoCA® only ports and MoCA® and CATV ports are connected to a MoCA® rejection filter, which is in turn connected to an input connected to a service provider. In the passive, POE splitter or the RF amplifier, an intuitive female coaxial port layout and marking scheme assists technicians with correctly connecting the POE splitter or RF amplifier to the correct coaxial cables at a customer's premises. The port layout also simplifies the circuitry design parameters on a printed circuit board (PCB) by orienting the "CATV & MoCA®" output ports at similar distances from a CATV input port of the POE splitter or RF amplifier.

18 Claims, 15 Drawing Sheets

(56) References Cited

U.S. PATENT DOCUMENTS

| | | | |
|---|---|---|---|
| 6,285,252 B1 * | 9/2001 | Huang | H03F 1/3229 |
| | | | 330/149 |
| 6,969,278 B2 | 11/2005 | Shapson | |
| 7,310,355 B1 | 12/2007 | Krein et al. | |
| 7,530,091 B2 | 5/2009 | Vaughan | |
| 8,230,470 B2 | 7/2012 | Robertson et al. | |
| 8,286,209 B2 * | 10/2012 | Egan, Jr | H04N 7/102 |
| | | | 725/74 |
| 8,397,271 B2 | 3/2013 | Riggsby | |
| 8,479,247 B2 | 7/2013 | Shafer | |
| 8,561,125 B2 | 10/2013 | Alkan et al. | |
| 8,589,997 B2 | 11/2013 | Wells | |
| 8,695,055 B2 | 4/2014 | Labro | |
| 8,752,114 B1 | 6/2014 | Shapson et al. | |
| 8,810,334 B2 | 8/2014 | Rijssemus | |
| 9,094,226 B2 | 7/2015 | Kliger et al. | |
| 9,167,286 B2 | 10/2015 | Wells | |
| 9,209,774 B2 | 12/2015 | Rijssemus | |
| 9,356,796 B2 | 5/2016 | Shapson et al. | |
| 9,516,376 B2 | 12/2016 | Wells et al. | |
| 9,743,038 B2 | 8/2017 | Li | |
| 9,795,043 B2 | 10/2017 | Li et al. | |
| 2005/0044573 A1 | 2/2005 | Preschutti | |
| 2006/0205442 A1 | 9/2006 | Phillips et al. | |
| 2008/0120667 A1 | 5/2008 | Zaltsman | |
| 2008/0148325 A1 | 6/2008 | Robertson et al. | |
| 2009/0077608 A1 | 3/2009 | Romerein et al. | |
| 2009/0320086 A1 | 12/2009 | Rijssemus et al. | |
| 2010/0194489 A1 | 8/2010 | Kearns et al. | |
| 2011/0002245 A1 | 1/2011 | Wall et al. | |
| 2011/0085089 A1 | 4/2011 | Jung | |
| 2011/0222549 A1 * | 9/2011 | Connelly | G06F 8/65 |
| | | | 370/401 |
| 2012/0159556 A1 | 6/2012 | Alkan | |
| 2013/0002958 A1 | 1/2013 | Labro | |
| 2013/0081096 A1 | 3/2013 | Wells et al. | |
| 2013/0091533 A1 | 4/2013 | Wells et al. | |
| 2013/0181789 A1 | 7/2013 | Rijssemus | |
| 2013/0227632 A1 | 8/2013 | Wells et al. | |
| 2015/0207525 A1 | 7/2015 | Li | |
| 2015/0304732 A1 * | 10/2015 | Shapson | H04N 7/17309 |
| | | | 725/149 |

OTHER PUBLICATIONS

ANTRONIX Brochure, MicroAmp MRA Series, Apr. 2008.
ANTRONIX Brochure, Residential Amplifier with Active Forward & Return FRA Series, Jul. 2015.
PCT International Brochure, Product Specifications PCT-MPI-1G Power Inserter, 5 to 1002 MHz, 2015.

* cited by examiner

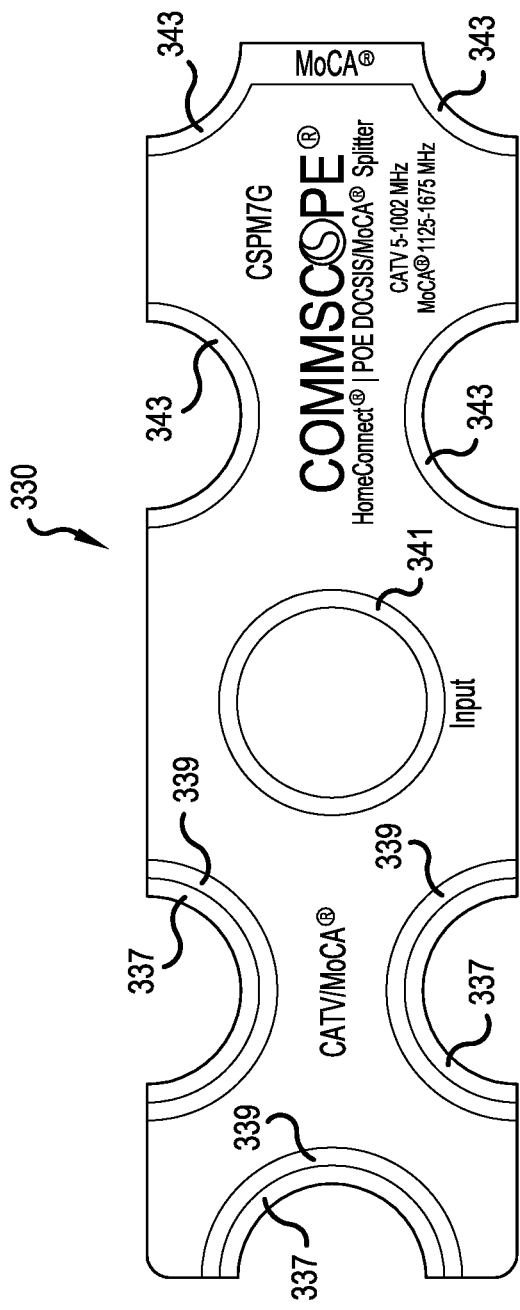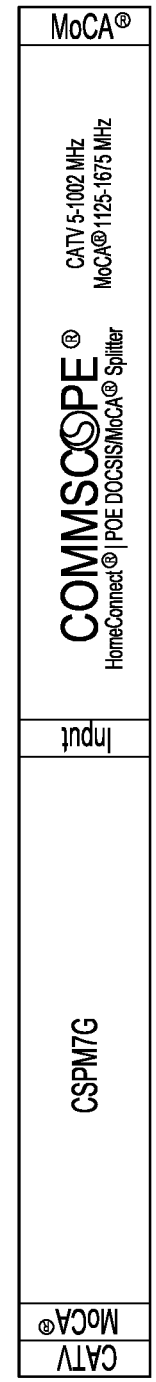
FIG.6
FIG.7

POINT OF ENTRY (POE) SPLITTER CIRCUITRY

This utility application is a continuation of U.S. Utility application Ser. No. 16/133,678, filed Sep. 17, 2018, which is a continuation of U.S. Design application Ser. No. 29/641,575, filed Mar. 22, 2018, and which also claims the benefit of U.S. Provisional Application Ser. No. 62/584,890, filed Nov. 12, 2017 and U.S. Provisional Application Ser. No. 62/559,833, filed Sep. 18, 2017, with each of the four prior applications being herein incorporated by reference.

BACKGROUND OF THE INVENTION

1. Field of the Invention

The present invention is directed to a passive splitter that provides one or more "CATV & MoCA®" outputs and plural "MoCA® only" outputs. More particularly, the present invention relates to a low-cost, passive point of entry (POE) splitter for a subscriber's premises, which utilizes a resistive splitter network.

The invention is directed to an intuitive female coaxial port layout and marking scheme to assist technicians with correctly connecting a point of entry (POE) splitter or amplifier to coaxial cables at a subscriber's premises. The port layout also simplifies the circuitry design parameters on a printed circuit board (PCB) by orienting the "CATV & MoCA®" output ports at similar distances from a CATV input port of the POE splitter or amplifier.

2. Description of the Related Art

Cable television ("CATV") networks are known types of communications networks that are used to transmit information between a service provider and a plurality of subscriber premises, typically over fiber optic and/or coaxial cables. The service provider may offer, among other things, cable television, broadband Internet and Voice-over-Internet Protocol ("VoIP") digital telephone service to subscribers within a particular geographic area. The service provider transmits "forward path" or "downstream" signals from the headend facilities of the cable television network to the subscriber premises. "Reverse path" or "upstream" signals may also be transmitted from the individual subscriber premises back to the headend facilities. In the United States, the forward path signals are typically transmitted in the 54-1,002 MHz frequency band, and may include, for example, different tiers of cable television channels, movies on demand, digital telephone and/or Internet service, and other broadcast or point-to-point offerings. The reverse path signals are typically transmitted in the 5-42 MHz frequency band and may include, for example, signals associated with digital telephone and/or Internet service and ordering commands, i.e., for movies-on-demand and other services.

Each subscriber premises typically includes one or more power divider networks that are used to divide the downstream signals received from the service provider, so that the downstream signals may be fed to a plurality of service ports, such as wall outlets that are dispersed throughout the subscriber premises. These power divider networks also combine upstream signals that may be transmitted from one or more of the service ports into a composite upstream signal that is transmitted over the CATV network back to the headend facilities, e.g., in the 5-42 MHz frequency band.

A recent trend is to use the coaxial cables that are installed throughout most homes, apartments and other subscriber premises as an "in-premises" or "in-home" network that may be used to transmit signals from a first end device that is connected to a first wall outlet in a subscriber premises to other end devices that are connected to other wall outlets in the same subscriber premises. An industry alliance known as the Multi-media Over Coax Alliance ("MoCA®") has developed standards which specify frequency bands, interfaces and other parameters that will allow equipment from different standards-compliant vendors to be used to distribute multi-media content over such in-premises coaxial cable networks. These standards specify that such "MoCA®" content is transmitted over the in-premises coaxial cable networks in the 850 MHz to 1675 MHz frequency band, although some service providers only distribute MoCA® content within a narrower frequency band that is above the cable television band, such as, for example, the 1,125 MHz to 1,675 MHz frequency band. Thus, the MoCA® content is transmitted over the in-premises network in a pre-selected MoCA® frequency band. The power divider network in the in-premises network may be designed to support communications between its output ports in this pre-selected MoCA® frequency band.

Examples of MoCA® content that may be distributed over an in-premises coaxial cable network are digital television, video-on-demand programming and digitally-recorded television or music programming. In an exemplary application, such programming may be transmitted via the in-premises network of a home from a primary set-top box (which may be a full service set top box having a digital television receiver, DVR and/or video-on-demand capabilities, etc.) to less capable, less expensive, auxiliary set-top boxes that are installed on other televisions throughout the premises or directly to televisions, DVD players, etc. with MoCA® ports. In this manner, the full capabilities of the primary set top box may be enjoyed at all of the televisions within the residence without having to provide a primary set top box for each television.

In many cases, significant attenuation may occur as signals are passed through the cable television network of a service provider, and hence the power level of the RF signal that is received at a subscriber premises may be on the order of 0-5 dBmV/channel. Such received signal levels may be insufficient to support the various services at an acceptable quality of service level. Accordingly, an RF signal amplifier may be provided at or near an entrance point of an individual subscriber's premises. The RF signal amplifier is used to amplify the downstream RF signals to a more useful level. The RF signal amplifier may also be configured to amplify the upstream RF signals that are transmitted from the subscriber premises to the headend facilities of the cable television network. Typically, the RF signal amplifiers are incorporated into the power divider network as the first unit, which takes the form of a powered bi-directional RF signal amplifier with an input port for receiving a coaxial cable from the service provider side and plural output ports which receive coaxial cables connected to the various service ports, such as the wall outlets that are dispersed throughout the subscriber's premises.

In accordance with the known power divider network unit, a RF signal amplifier receives a composite downstream RF signal of approximately 5 dBmV/channel in the range of approximately 54-1,002 MHz comprising information for telephone, cable television (CATV), Internet, VoIP, and/or data communications from a service provider. The RF signal amplifier may increase this downstream signal to a more useful level of approximately 20 dBmV/channel at each output port of the unit and pass the amplified downstream signal to one or more devices in communication with the RF signal amplifier through connections to the various coaxial wall outlets. Such devices may include, but need not be limited to: televisions, modems, telephones, computers, and/or other communications devices known in the art. In the event of power failure, unamplified signals may still be passed (in both directions) through a passive communications path between the service provider and at least one communications device.

FIG. 1 illustrates a block diagram of a bi-directional RF signal amplifier 100 according to the background art. More information concerning the bi-directional RF signal amplifier 100 can be found in the Assignee's U.S. Pat. No. 9,699,516, published Jul. 4, 2017, the entire contents of which are herein incorporated by reference.

The RF signal amplifier 100 includes a plurality of RF output ports 181-188 that may be used to pass downstream and upstream signals between a service provider and multiple communications devices located in the subscriber premises when the RF signal amplifier is powered and operating normally. Moreover, the RF signal amplifier 100 further includes a non-interruptible RF output port 189 that may be used to maintain bi-directional RF communications even during power outages.

As shown in FIG. 1, RF signal amplifier 100 includes a bi-directional RF input port 105 for receiving downstream RF signals from a service provider, or any other appropriate signal source. The RF input port 105 can also pass upstream signals in the reverse direction from the RF signal amplifier 100 to the service provider. Due to the bi-directional nature of communications through RF signal amplifiers, it will be appreciated that an "input" port will act as an "output" port and an "output" port will act as an "input" port if the direction of signal flow is reversed. Consequently, it will be appreciated that the terms "input" and "output" are used herein solely for purposes of distinguishing various ports from one another, and are not used to require a direction of signal flow.

As noted above, RF signal amplifier 100 further includes a plurality of bi-directional output ports 181-189 that may be used to pass downstream RF signals from the RF signal amplifier 100 to one or more devices in communication with the output ports 181-189, and to receive upstream RF signals from those devices so that they may be passed through the RF signal amplifier 100 to the service provider. It will be appreciated that any appropriate device that may advantageously send and/or receive an RF signal may be placed in communication with one or more of the various output ports 181-189. For example, it is contemplated that telephone, CATV, Internet, VoIP, and/or data communication devices may be placed in such communication with a service provider where the RF signal amplifier 100 is installed in the residence of a subscriber. However, it will further be appreciated that any desired combination of these and/or other devices may be used where appropriate.

Signals received through RF input port 105 can be passed through RF signal amplifier 100 via an active communications path 114 that extends between RF input port 105 and RF output ports 181-188. Specifically, the downstream signals that are received at RF input port 105 from the service provider are passed to a passive directional coupler 110 that has a first output port that connects to the active communications path 114 and a second output port that connects to a passive communications path 118. The directional coupler 120 splits downstream RF signals onto the active communications path 114 and the passive communications path 118. It will be appreciated that the directional coupler 120 may either evenly or unevenly split the power of the downstream signals between the communications paths 114, 118, depending on the design of the overall circuit. The active communications path 114 amplifies at least one of downstream signals from the service provider to the subscriber premises or upstream signals from the subscriber premises to the service provider. The passive communications path 118 acts as a "non-interruptible" communications path that has no active components thereon, which allows downstream and/or upstream signals to traverse the passive communications path 118 even if a power supply to the RF signal amplifier 100 is interrupted. In some embodiments, the passive communications path 118 may provide a communications path for VoIP telephone service that will operate even during power outages at the subscriber premises (assuming that the modem and/or telephone, as necessary, are powered by a battery backup unit).

As is further shown in FIG. 1, downstream signals traversing the active communications path 114 pass from the first output of directional coupler 110 to an input port of a switching device such as, for example, an SPDT non-latching relay 120. A first output 122 of the relay 120 is connected to an input of a first high/low diplexer 130. A second output 124 of the relay 120 is connected to a resistor 126, such as a 75 ohm resistor connected between the second output 124 and ground.

The first high/low diplexer 130 separates the high frequency downstream signal from any low frequency upstream signals incident in the reverse direction. In various embodiments, the first high/low diplexer 130 can filter the signals in a manner such that signals with frequencies greater than approximately 45-50 MHz are passed as high frequency downstream signals, while signals with frequencies lower than such range are passed in the reverse direction as low frequency upstream signals received from ports 181-188. It will be appreciated, however, that other diplexer designs may be utilized.

The high frequency downstream signals filtered by the first high/low diplexer 130 can be amplified by individual power amplifier 140, and passed through a second high/low diplexer 150 to a MoCA® rejection filter 160. MoCA® rejection filter 160 attenuates any frequencies in the MoCA® frequency range. Typically, no signals in the downstream direction will contain MoCA® frequencies and hence the downstream signal will be unaffected.

Next, the downstream signal passes to an input 169 of a power divider network 170. The power divider network 170 splits the downstream signal so that it may be distributed to each of ports 181-188. In the embodiment of FIG. 1, the power divider network 170 includes a power divider 171 in a first tier, feeding power dividers 172 and 173 in a second tier, feeding power dividers 174, 175, 176 and 177 in a third tier. The first, second and third tiers form a pyramid structure. While the power divider network 170 illustrated in FIG. 1 splits the downstream signals for distribution to eight different ports, it will be appreciated that the power divider network 170 may split the downstream signals for distribution to different numbers of ports (e.g., four, six, ten, etc.).

Turning now to the reverse (upstream) signal flow through the active communications path 114 of RF signal amplifier 100, upstream signals received by the RF signal amplifier 100 from devices in communication with ports 181-188 are passed to power divider network 170 where they are combined into a composite upstream signal. This composite upstream signal is fed out of input 169 through the MoCA® rejection filter 160. The MoCA® rejection filter 160 attenuates frequencies in the MoCA® frequency range so as to prevent the MoCA® signaling, which freely traverses between the ports 181-188, from entering the second high/low diplexer 150. The second high/low diplexer 150 separates the low frequency composite upstream signal from any high frequency downstream signals incident in the forward direction. As previously discussed in relation to first high/low diplexer 130, the second high/low diplexer 150 can filter the signals such that signals with frequencies greater than approximately 45-50 MHz are passed in the forward direction as high frequency downstream signals, while signals with frequencies lower than such range are passed in the reverse direction as low frequency upstream signals received from ports 181-188.

The composite low frequency upstream signal filtered by the second high/low diplexer 150 can be passed directly to the first high/low diplexer 130 (or optionally the upstream signal filtered by the second high/low diplexer 150 can pass through an upstream power amplifier 142 prior to reaching the first high/low diplexer 130), where it is then passed through the first output port 122 of the non-latching SPDT relay 120 to the first output port of the directional coupler 110. The directional coupler 110 combines the upstream signal received at output port 122 with any upstream signal received from the passive communications path 118 and passes this combined signal to the RF input port 105 for output to a service provider or other entity in communication with RF input port 105.

The power amplifiers 140 and 142 that are included on the active communications path 114 are active devices that must be powered via a power source, such as a DC linear regulator 195 that outputs a power supply voltage VCC. During normal operation, the RF signal amplifier 100 can be powered from a power input port 190 and/or power that is reverse fed through one of the RF output ports (e.g., output port 188, which is labeled "VDC IN"). In a typical installation at a subscriber premises, it is contemplated that RF signal amplifier 100 may be powered by an AC/DC adapter receiving power provided by the residence (for example, 100-230 VAC, 50/60 Hz). As illustrated in FIG. 1, the power received from either power input 190 or power input 188 may be provided to the DC voltage regulator 195 which supplies an operating voltage VCC to the power amplifiers 140 and 142.

In the event that power to the DC voltage regulator 195 is interrupted, DC voltage regulator 195 will be unable to provide operating voltage VCC to power amplifiers 140 and 142. Consequently, during power outages, the downstream portion (and also the upstream portion, if the upstream power amplifier 142 is employed) of the active communications path 114 will be lost.

As noted above, RF signal amplifier 100 also has the passive communications path 118 that extends from the second output of the directional coupler 120 to the non-interruptible RF output port 189. This passive communication path 118 bypasses the power amplifiers 140 and 142 and does not include any active components. Consequently, the passive communications path 118 will remain available to pass communications between the RF input port 105 and the non-interruptible RF output port 189, even when the power supply to the RF signal amplifier 100 is interrupted. Accordingly, the passive communications path 118 is also referred to as a "non-interruptible" communications path. The passive communications path 118 may be used to maintain essential services to the subscriber premises such as, for example, 911 emergency lifeline services, even during power outages, so long as the subscriber has a battery backup for the necessary devices connected to the non-interruptible RF output port 189.

The passive communications path 118 is connected to the active communications path 114 at the input 169 of the power divider network 170. Within the passive communication path 118, upstream signals from the non-interruptible RF output port 189 pass into an input 168 of a diplexer 162. Signals in the MoCA® frequency range exit the diplexer 162 via output 164 and pass to the active communication path directly upstream of the power divider network 170. By this arrangement, MoCA® signals from the non-interruptible RF output port 189 may enter the input 169 of the power divider network 170. Hence, MoCA® signals may be passed between all of the devices connected to ports 181-189.

The signals from the non-interruptible RF output port 189 which pass into the input 168 of a diplexer 162, which are in the high/low frequency range for downstream and upstream communication with the service provider exit the diplexer 162 via output 166 and pass to the second output of the directional coupler 110, where the signals are combined with the signals on the active communication path 114 and are then passed to the RF input port 105.

Additional background art can be found in U.S. Pat. Nos. 3,676,744; 6,969,278; 7,310,355; 7,530,091; 8,230,470, 8,695,055; 8,752,114; 8,810,334; 9,167,286; 9,209,774; 9,356,796; 9,516,376 and 9,743,038, and in US Published Application Nos. 2005/0044573; 2006/0205442; 2008/0120667; 2009/0320086 and 2013/0081096, which are herein incorporated by reference.

SUMMARY OF THE INVENTION

The Applicant has appreciated some drawbacks in the RF signal amplifier 100 of FIG. 1. One drawback is that the downstream signal from the service provider must be provided to the RF input port 105 at a relative high power level, or the downstream amplifier 140 must be made rather robust and will consume a high level of power, if the CATV signal is to be provided at each of the ports 181-188 at a power level sufficient to provide a high quality of service. In other words, assuming that each power divider 171-177 is set to split the incoming signal power to 50% going to each output leg, the CATV signal entering the input 169 of the power divider 170 will be reduced by at least 87.5% before it reaches the port 181. Assuming no losses in the power dividers 171-177, each of the eight ports 181-188 will present, at best, 12.5% of the signal power level initially provided to the input 169 of the power divider network 170.

The Applicant has appreciated that it is common in household installations that not every coaxial outlet in the household needs to be prepared for CATV downstream signal feeds. Rather, many of the coaxial outlets are simply used for MoCA® devices. For example, a typical household might need only one, two, or at most three, coaxial outlets with CATV downstream and upstream signaling abilities. Most houses seem to have one or two of the expensive set top boxes with DVR abilities and a modem for internet communications. Other outlets in the house might only need MoCA® abilities. For example, a TV that is used to watch recorded events from the DVR, a computer that interacts with the modem for internet access, a VoIP phone that interacts with the modem, a gaming station that only interacts with another gaming station at another wall outlet, etc.

Further, often times the signal strength of the downstream signal from the service provider is sufficient to power one, two or even three CATV downstream signal feeds within a household without the need of an amplifier within the customer's household.

Therefore, the Applicant has appreciated a new device, which functions as a point of entry (POE) splitter device that may be passive in nature. The POE splitter avoids the expense of amplifiers, like amplifiers 140 and/or 142 in FIG. 1, while still providing one, two or three "CATV & MoCA®" and plural "MoCA® only" output ports supplied by a resistive splitter network.

The housing of the new POE splitter also provides an intuitive female coaxial port layout and marking scheme to assist technicians with correctly connecting a POE splitter to the coaxial cables at a customer's premises. The port layout also simplifies the circuitry design parameters on a printed circuit board (PCB) by orienting the "CATV & MoCA®" output ports at similar distances from a CATV input port of the POE splitter.

The intuitive port layout and coloring scheme, as well as the distancing of the ports relative to each other could also be useful in other CATV devices, besides a passive POE splitter. For example, the port layout and coloring scheme could be employed in combination with a RF signal amplifier, similar to the RF signal amplifier 100 shown in FIG. 1.

In summation, the housing, and more particularly, the layout of the connection ports on the housing, is often times not intuitively presented to the field technician in the prior art devices. The present invention has an object to group the input and output ports in a more intuitive, or "fool-proof" arrangement, so as to clarify the connection ports to the technician. Besides the section grouping, a color coding scheme may be employed in conjunction with the port to indicate the port functions. The color coding scheme may be a label on the housing of the device and/or the use of different shades of dielectric inserts within the female coaxial ports.

Further, the present invention places several of the output ports at a nearly equal distance from the input port to offer advantages. Such an arrangement will simplify the circuitry design on the printed circuit board (PCB) within the housing through symmetry and by eliminating design constraints relating to signals needing to traverse different lengths or distances on the PCB, which can lead to imbalances requiring additional circuit components for compensation.

Also, some embodiments of the present invention reduce a number of component parts to achieve the same functions, as shown in the prior art. For example, the formation of a passive splitter with a plurality of MoCA®/CATV ports and a plurality of MoCA® only ports supported by a resistive splitter network is accomplished with fewer component parts, as compared to the prior art.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 6 depicts a top label for a top face of the POE splitter of FIGS. 4-5;

FIG. 7 depicts a side label for the a side face of the POE splitter of FIGS. 4-5;

DETAILED DESCRIPTION OF EMBODIMENTS OF THE INVENTION

Figure 1:
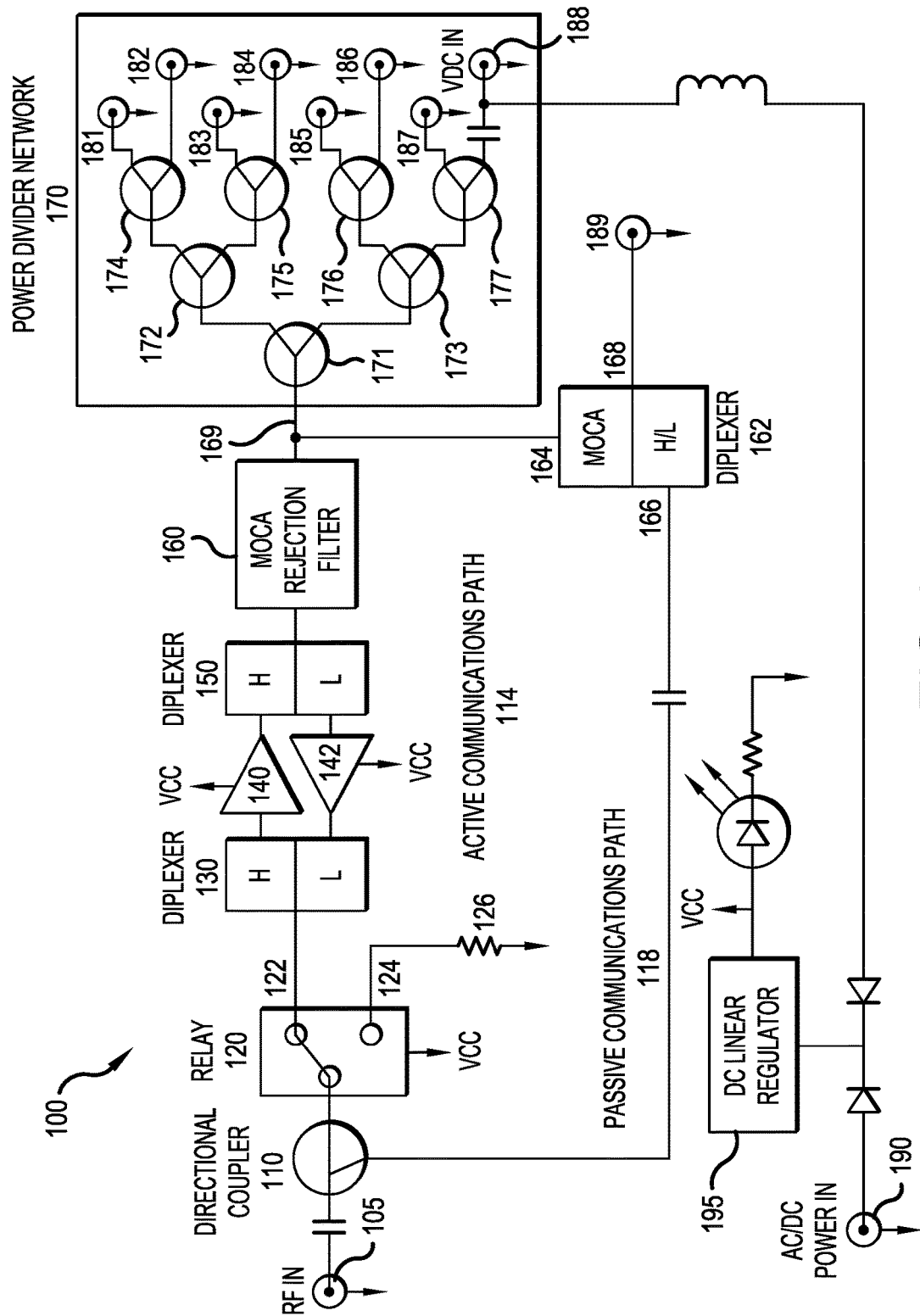
FIG. 1 is a block diagram of a bi-directional RF signal amplifier, according to the background art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
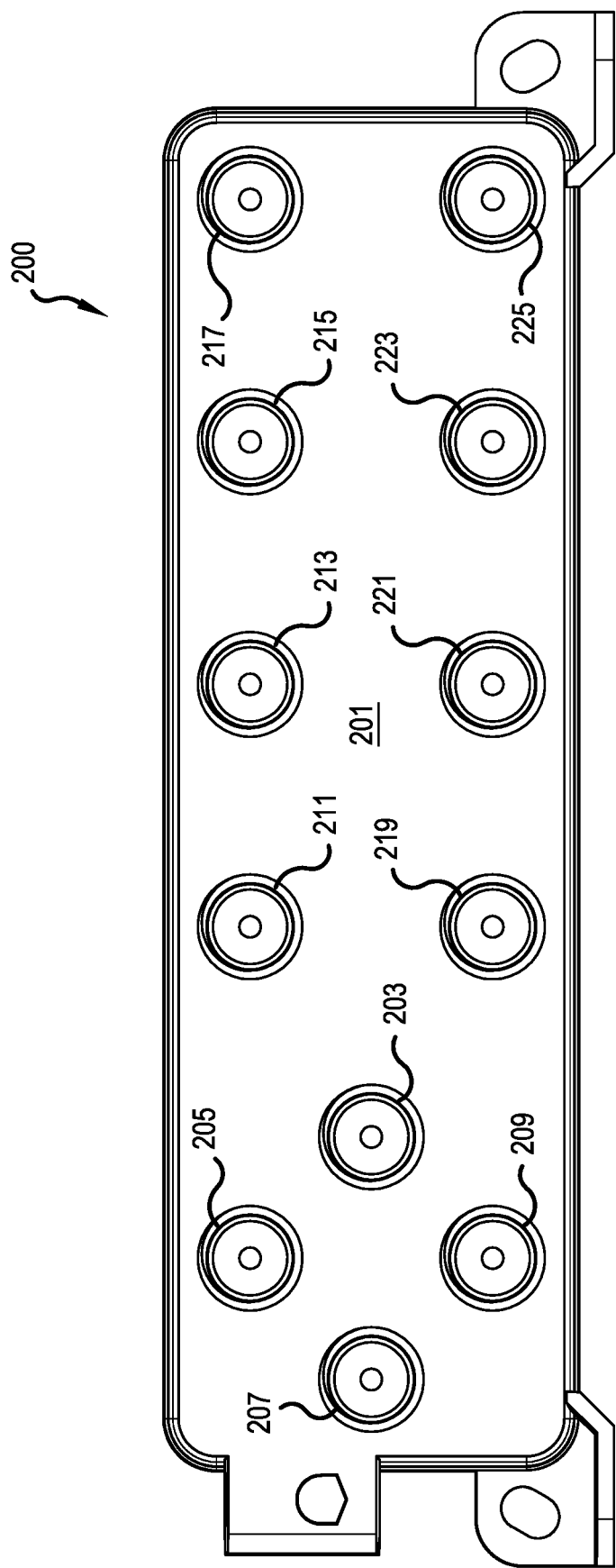
FIG. 2 is a top view of a housing of a CATV home network device, such as a passive, point of entry (POE) splitter, in accordance with a first embodiment of the present invention.
Figure 3:
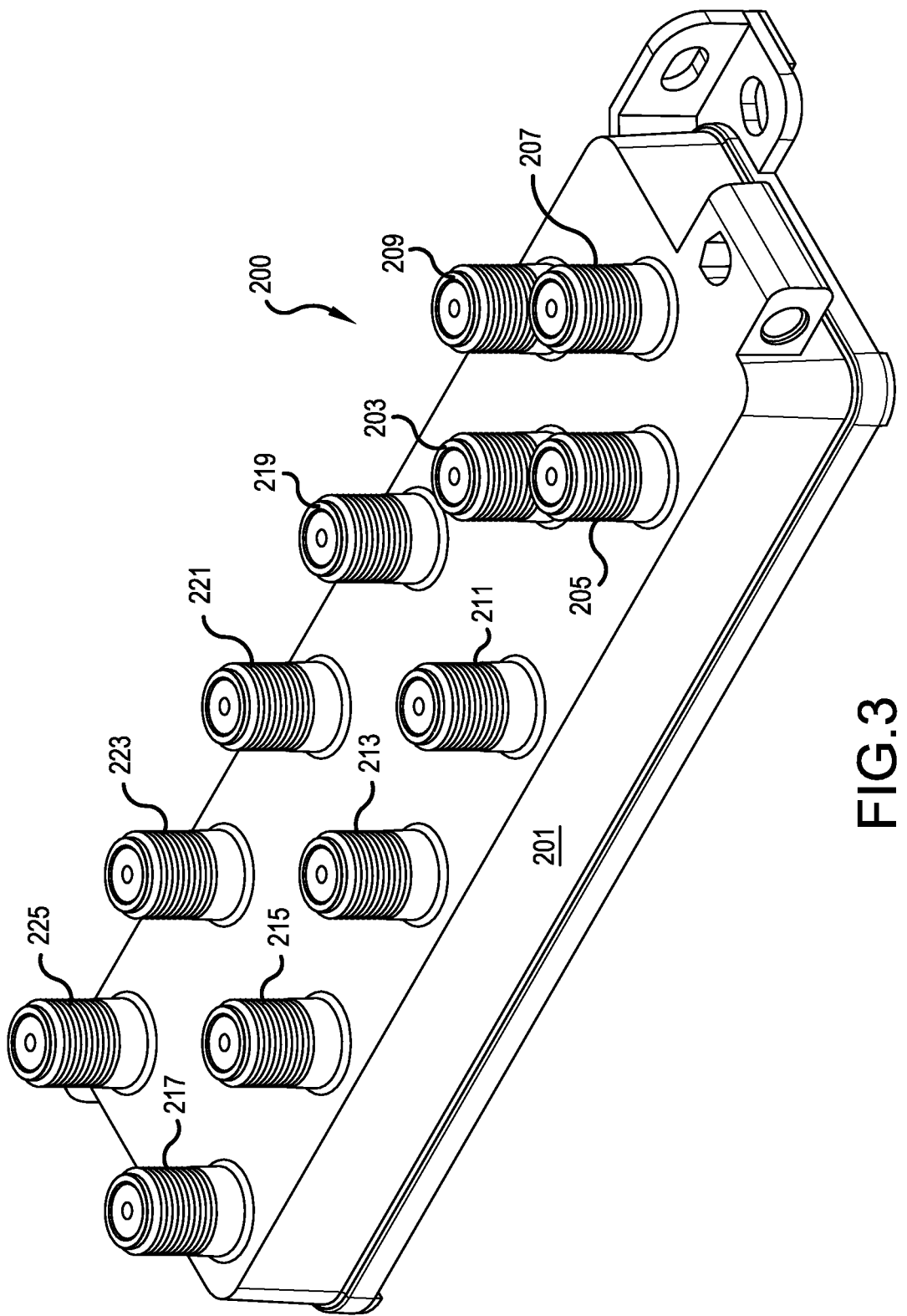
FIG. 3 is a front perspective view of the POE splitter of FIG. 2.

A top view and a front perspective view of a housing 201 of a CATV home network device, such as a passive, point of entry (POE) splitter 200, are shown in FIGS. 2 and 3. The housing 201 includes a female coaxial input port 203. The input port 203 is provided for receiving downstream service provider signals and for transmitting upstream signals from customer devices to the service provider.

A plurality of first output ports 205, 207 and 209 are provided for outputting service provider signals to customer devices and for receiving signals directed to the service provider. The plurality of first output ports 205, 207 and 209 are also provided for transmitting and receiving in-home network signals allowing customer devices within the home network to communicate with each other.

A plurality of second output ports 211, 213, 215, 217, 219, 221, 223 and 225 are provided for transmitting and receiving in-home network signals allowing customer devices within the home network to communicate with each other. The plurality of second output ports 211, 213, 215, 217, 219, 221, 223 and 225 do not output service provider signals to customer devices and do not pass customer device signals to the service provider.

Although FIGS. 2-3 show three ports in the plurality of first output ports 205, 207, and 209, more or fewer ports may be provided, such as one, two or four ports. Although FIGS. 2-3 show eight ports in the plurality of second output ports 211, 213, 215, 217, 219, 221, 223 and 225, more or fewer ports may be provided, such as three, four, five, six or ten ports.

Figure 4:
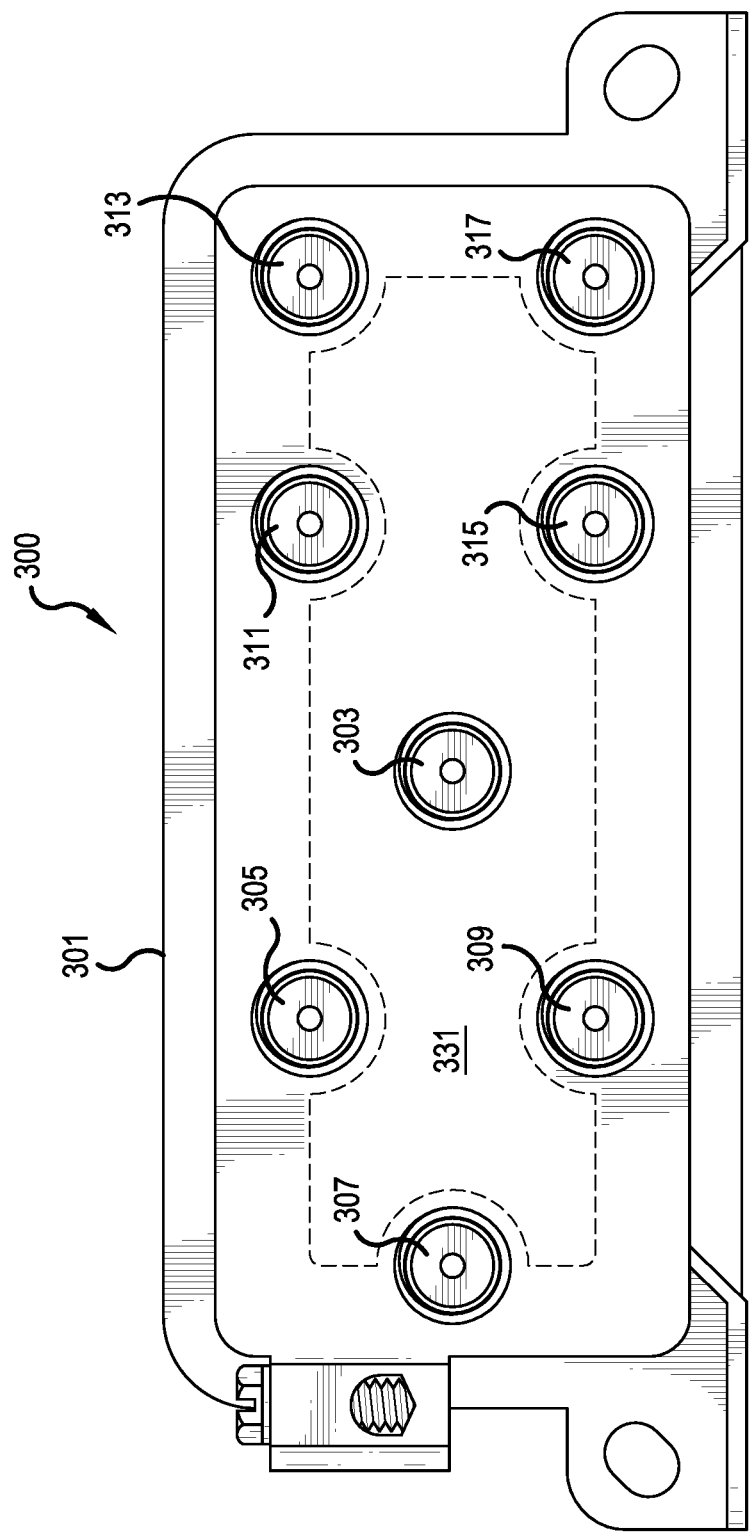
FIG. 4 is a top view of a housing of a (POE) splitter, in accordance with a second embodiment of the present invention.
Figure 5:
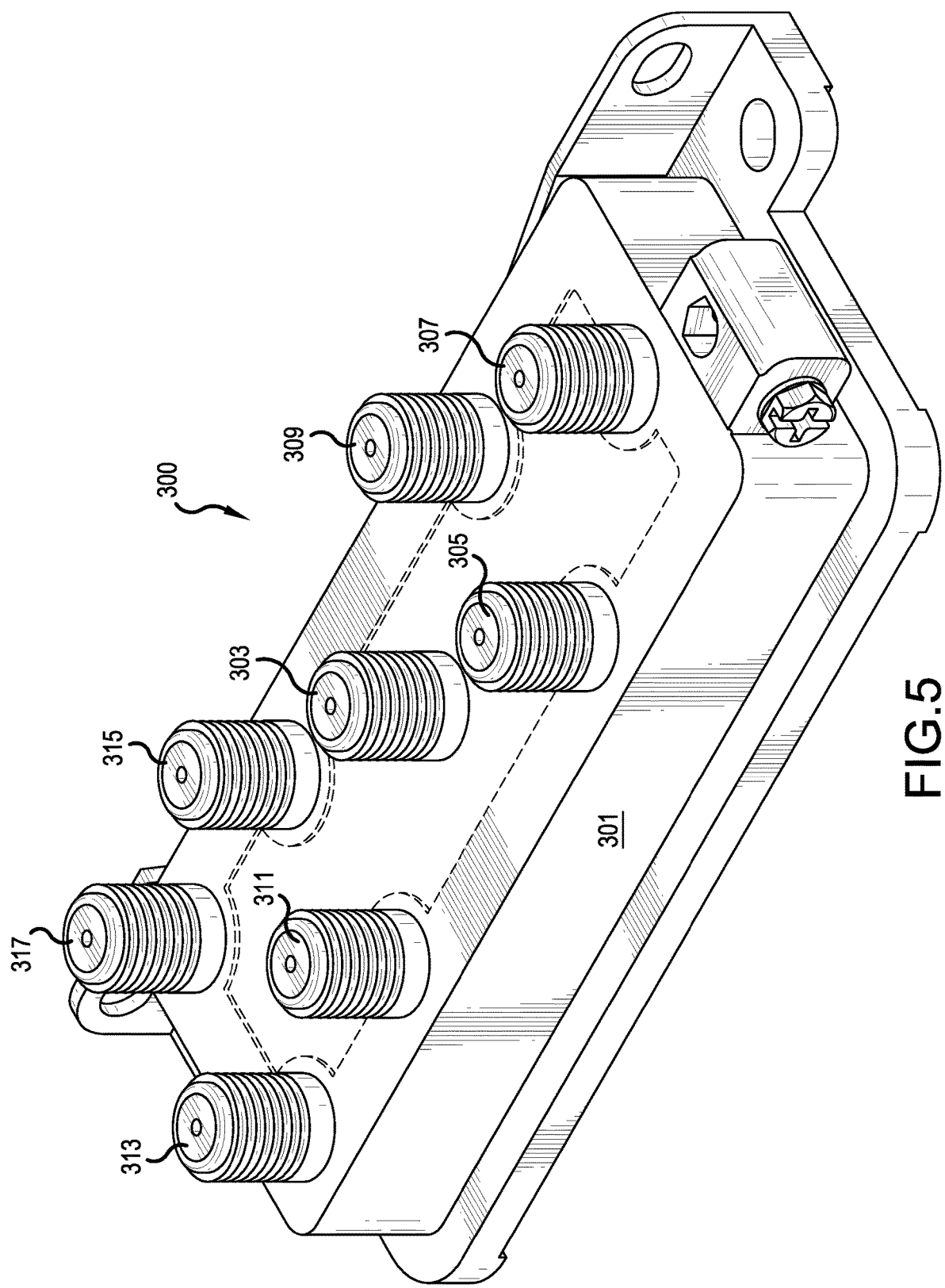
FIG. 5 is a front perspective view of the POE splitter of FIG. 4.

For example, FIGS. 4 and 5 are a top view and a front perspective view of a housing 301 of a passive, POE splitter 300. The housing 301 may be formed of brass or any other conductive material, but in a preferred embodiment, the housing 301 is formed of zinc or a zinc alloy. The housing 301 includes a female coaxial RF input port 303. The input port 303 is provided for receiving downstream service provider signals and for transmitting upstream signals from customer devices to the service provider.

A plurality of first output ports 305, 307 and 309 are provided for outputting service provider signals to customer devices and for receiving signals directed to the service provider. The plurality of first output ports 305, 307 and 309 are also provided for transmitting and receiving in-home network signals allowing customer devices within the home network to communicate with each other.

A plurality of second output ports 311, 313, 315 and 317 are provided for transmitting and receiving in-home network signals allowing customer devices within the home network to communication with each other. The plurality of second output ports 311, 313, 315 and 317 do not output service provider signals to customer devices and do not pass customer device signals to the service provider.

Figure 9:
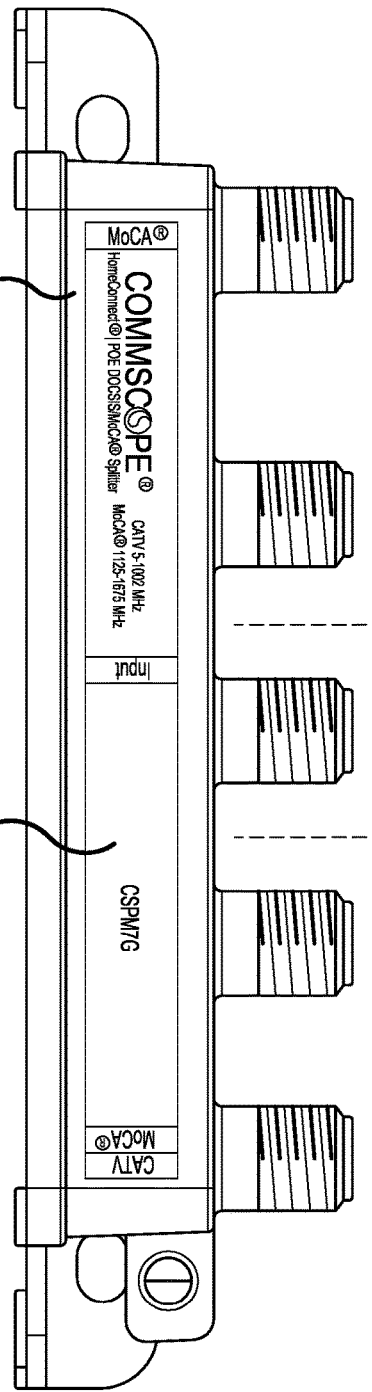
FIG. 9 is a side view of the POE splitter of FIGS. 4-5 with the side label of FIG. 7 applied thereto.
Figure 8:
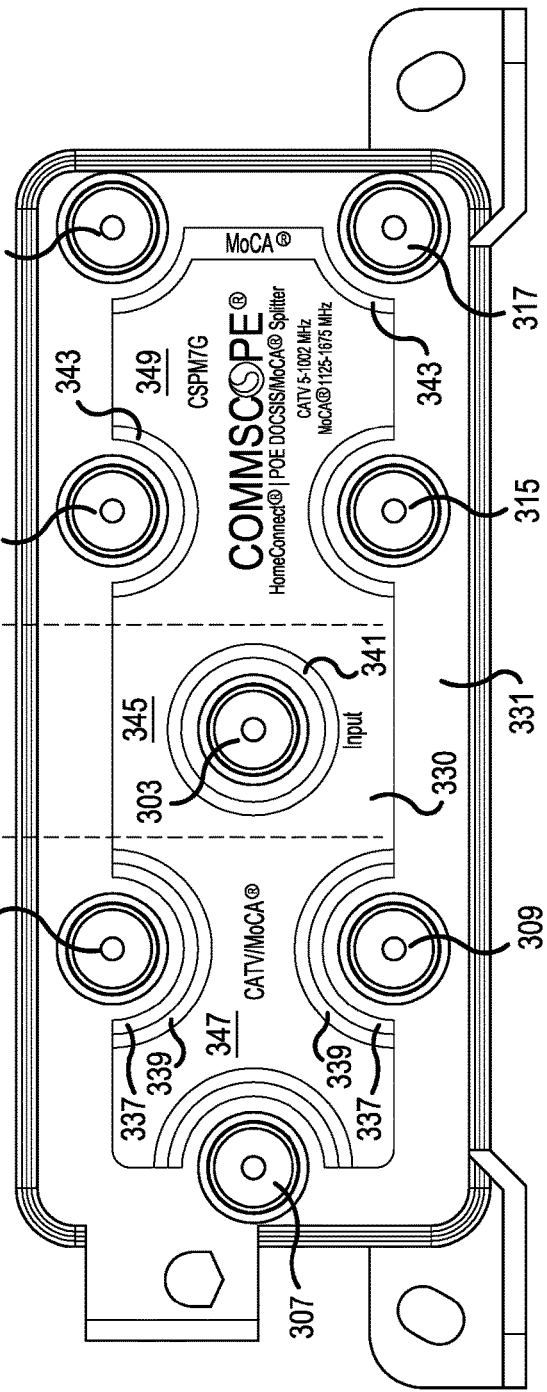
FIG. 8 is a top view of the POE splitter of FIGS. 4-5 with the top label of FIG. 6 applied thereto.

FIGS. 6 and 7 depict a top face label 330 and a side label 335, respectively. The top face label 330 is dimensioned to be adhered to a top face 331 of the housing 301 (FIGS. 4 and 5). The side label 335 is dimensioned to be adhered to a side face of the housing 301. The labels 330 and 335 cause the plurality of first output ports 305, 307 and 309 to be labeled as "CATV/MoCA®" ports, and the plurality of second output ports 311, 313, 315 and 317 to be labeled as "MoCA® only" ports, as best seen in FIGS. 8 and 9, which depict the labels 330 and 335 applied to the top face 331 and the side face of the housing 301.

The labels may include color coding. For example, the "CATV/MoCA®" ports may be partially or wholly encircled by a yellow line 337, further encircled by a black line 339. The input port 303 may be partially or wholly encircled by a blue line 341. The "MoCA® only" ports 311, 313, 315 and 317 be partially or wholly encircled by only a yellow line 343.

In a preferred embodiment, each of the input port 303 and the plurality of first and second output ports 305, 307, 309, 311, 313, 315 and 317 is formed as a female coaxial port. The input port 303 is located proximate a first, central section 345 of the top face 331. A second section 347 of the top face 331 is provided on one side of the first section 345. The second section 347 includes the plurality of first output ports 305, 307 and 309. A third section 349 is provided on the top face 331, on an opposite side of the first section 345. The third section 349 includes the plurality of second output ports 311, 313, 315 and 317. In other words, the first section 345 is located between the second section 347 and the third section 349 on the top face 331.

As noted above, the first section 345 is a characterized by a first color or colors, proximate the input port 303. Although a blue line 341 encircling the input port 303 is shown, the entire first section 345 may be colored blue. The second section 347 is characterized by a second color or colors proximate the plurality of first output ports 305, 307 and 309. Although a black line 339 partially encircling a yellow line 337, partially encircling the plurality of first output ports 305, 307 and 309 is shown, the entire second section 347 may be colored in a distinguishable pattern, e.g., continuous black and yellow stripes. The third section 349 is characterized by a third color or colors proximate the plurality of second output ports 311, 313, 315 and 317. Although a yellow line 343 partially encircling the plurality of second output ports 311, 313, 315 and 317 is shown, the entire third section 349 may be colored in a distinguishable pattern, e.g., solid yellow.

The input port 303 and plurality of first and second output ports 305, 307, 309, 311, 313, 315 and 317 are all formed as female coaxial ports, each having a dielectric insert for surrounding the pin receiving portion. The dielectric inserts for the plurality of first output ports 305, 307 and 309 may have a first shade, e.g., white, and the dielectric insert for the input port 303 may have a second shade, e.g., blue or red. The dielectric inserts for the plurality of second output ports 311, 313, 315 and 317 may have a third shade, e.g., green. In other words, the first shade is visually distinguishable from the second shade and the third shade, and the second shade is visually distinguishable from the third shade.

As best seen in FIG. 4, the plurality of first output ports 305, 307 and 309 includes first and third female coaxial ports 305 and 309, each having a centrally located pin receiving portion. The input port 303 is formed as a fourth female coaxial port having a pin receiving portion. The pin receiving portion of the fourth female coaxial port 303 is located a first distance, e.g., 23.5 mm, from the pin receiving portion of the first female coaxial port 305. The pin receiving portion of the fourth female coaxial port 303 is located a second distance, e.g., 23.5 mm, from the pin receiving portion of said third female coaxial port 309.

The first distance is approximately equal to the second distance. In the illustrated embodiment, the first distance is equal to the second distance. When the phrase "approximately equal" as used in this application for the purposes of a comparison between two lengths, the phrase means that the longer distance is less than 10% greater than the shorter distance. e.g., if the first distance were 10 mm, the second distance would be less than 11.00 mm and greater than 9.09 mm. Where the word "equal" without a modifier is used in this application for the purposes of a comparison between two lengths, the word shall encompass a minor manufacturing tolerance, such as less than a +/−1% difference in the two compared lengths.

The plurality of first output ports 305, 307 and 309 also includes a second female coaxial port 307 having a centrally located pin receiving portion. The pin receiving portion of the fourth female coaxial port 303 is located a third distance from the pin receiving portion of the second female coaxial port 307.

Although FIG. 4 is not to scale, in a preferred embodiment, the third distance is approximately equal to the first distance, and may equal the first distance. This may be accomplished by designating the pin receiving portion of the fourth female coaxial port 303 as a center of a circle and by placing the pin receiving portions of the first, second and third female coaxial ports 305, 307 and 309 at or near a same radius from the center of the pin receiving portion of the fourth female coaxial port 303.

Placing all or several of the plurality of first output ports 305, 307 and 309 at a nearly equal distance from the input port 303 offers advantages. Such an arrangement will simply the circuitry design on a printed circuit board (PCB) within the housing 201 or 301 through symmetry and by eliminating design constraints relating to signals needing to traverse different lengths or distances on the PCB, which can lead to imbalances requiring additional circuit components for compensation.

Figure 10:
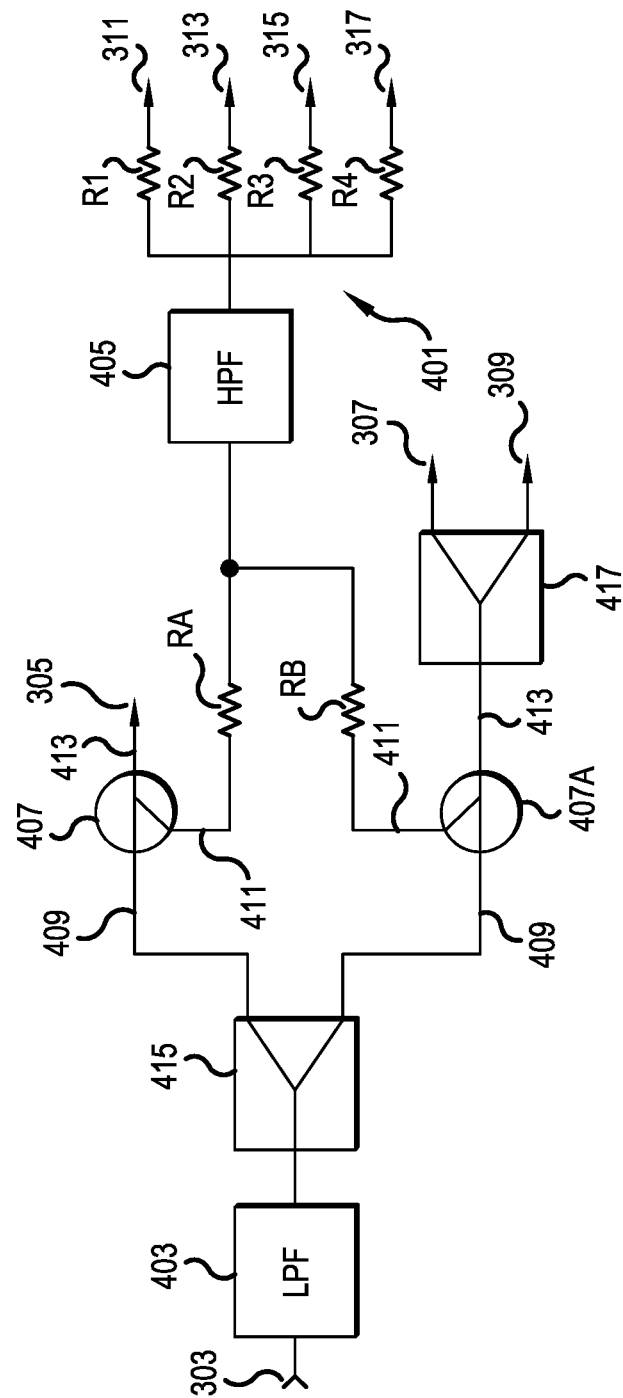
FIG. 10 is a high-level schematic, or block diagram, of a first embodiment of circuitry formed on at least one printed circuit board (PCB) within the housing of the POE splitter of FIGS. 4-5.

FIG. 10 shows a high-level schematic, or block diagram, of a first embodiment of circuitry formed on at least one printed circuit board (PCB) within the housing 301 of the POE splitter 300 of FIGS. 4-5.

A resistive splitter network 401 is connected to the plurality of second output ports 311, 313, 315 and 317. A single and sole in-home network rejection filter 403 is located within the housing 301 between the input port 303 and the plurality of first and second output ports 305, 307, 309, 311, 313, 315 and 317. The in-home network rejection filter 403 prevents signals of the in-home network from exiting the input port 303 toward the service provider.

In a preferred embodiment, the upstream and downstream signals associated with the service provider signals reside within a frequency band of 5 to 1002 MHz, and the in-home network signals reside within a MoCA® frequency band of 1125 to 1675 MHz, making said in-home network rejection filter 403, a MoCA® rejection filter 403.

A MoCA® pass filter 405, which passes MoCA® frequencies, but attenuates other frequencies, is also provided. The MoCA® pass filter 405 is located between the resistive splitter network 401 and the MoCA® rejection filter 403. The MoCA® pass filter 405 may pass frequencies above 1125 MHz and attenuate frequencies below 1125 MHz. However, in a preferred embodiment, the MoCA® pass filter 405 also attenuates frequencies above 1675 MHz.

In the first embodiment of FIG. 10, a first terminal of the MoCA® rejection filter 403 is directly connected to the input port 303 and a second terminal of the MoCA® rejection filter 403 is connected to an input of a first power divider 415. The first power divider 415 has first and second output legs. The first output leg of the first power divider 415 is connected to a first terminal 409 of a first directional coupler 407. A second terminal 411 of the first directional coupler 407 is connected to the MoCA® pass filter 405. A third terminal 413 of the first directional coupler 407 is directly connected to the first port 305 of the plurality of first output ports 305, 307 and 309.

In a preferred embodiment, the first directional coupler 407 is oriented as shown in FIG. 10, so that signals passing between the first terminal 409 and the third terminal 413 of the first directional coupler 407 in either direction suffer little attenuation, such as less than 2 dB, more preferably in the range of 0.5 to 1.0 dB, like 0.7 dB. Signals passing between the second terminal 411 and the third terminal 413 of the first directional coupler 407 in either direction suffer more attenuation, such as between 3 to 15 dB, more preferably between 5 and 10 dB, like 7 to 9 dB. Signals passing between the first terminal 409 and the second terminal 411 of the first directional coupler 407 in either direction suffer high attenuation, such as greater than 25 dB, more preferably greater than 30 dB, like 40 dB or more.

The second output leg of the first power divider 415 is connected to a first terminal 409 of a second directional coupler 407A. The second directional coupler 407A is formed like the first directional coupler 407, with reference to the dB losses between the first, second and third terminals 409, 411 and 413. The third terminal 413 of the second directional coupler 407A is connected to an input of a second power divider 417. The second power divider 417 has first and second output legs, directly connected to the second and third output ports 307 and 309 of the plurality of first output ports 305, 307 and 309, respectively.

The connection between the second terminal 411 of the first directional coupler 407 and a first terminal of the MoCA® pass filter 405 may include a resistor RA. Likewise, the connection between the second terminal 411 of the second directional coupler 407A and the first terminal of the MoCA® pass filter 405 may include a resistor RB. The resistors RA and RB may be used to balance the circuit, and in particular balance the function of the MoCA® pass filter 405 in combination with the resistive splitter network 401. The value of each resistor RA or RB, and would be less than 75 ohms, typically less than 50 ohm, more preferably less than 10 ohms. Also, one or both of the resistance values of resistors RA and RB may be zero, essentially indicating the absence of dedicated resistors in the connection between the second terminals 411 of the first and second directional couplers 407 and 407A and the MCA pass filter 405.

A second terminal of the MoCA® pass filter 405 is directly connected to the resistive splitter network 401. The resistive splitter network 401 of FIG. 10 includes four resistors R1, R2, R3 and R4. A first terminal of each of the resistors R1, R2, R3 and R4 is directly connected to the second terminal of the MoCA® pass filter 405. A second terminal of each of the resistors R1, R2, R3 and R4 is directly connected to the plurality of second output ports 311, 313, 315 and 317, respectively. The resistive values of the resistors R1, R2, R3 and R4 are selected to produce a port resistance of 75 ohm. Hence, the resistance of each resistor R1, R2, R3 and R4 is less than 75 ohms, typically in the range of 40 to 65 ohms, more particularly in the range of 45 to 60 ohms. Examples of resistor values which have balanced the resistive network 401 were 47 ohms, 53.5 ohm and 60 ohms, depending upon other design parameters within the circuit, like the resistor values of RA and RB, the number of ports in the plurality of second ports, etc.

Figure 11:
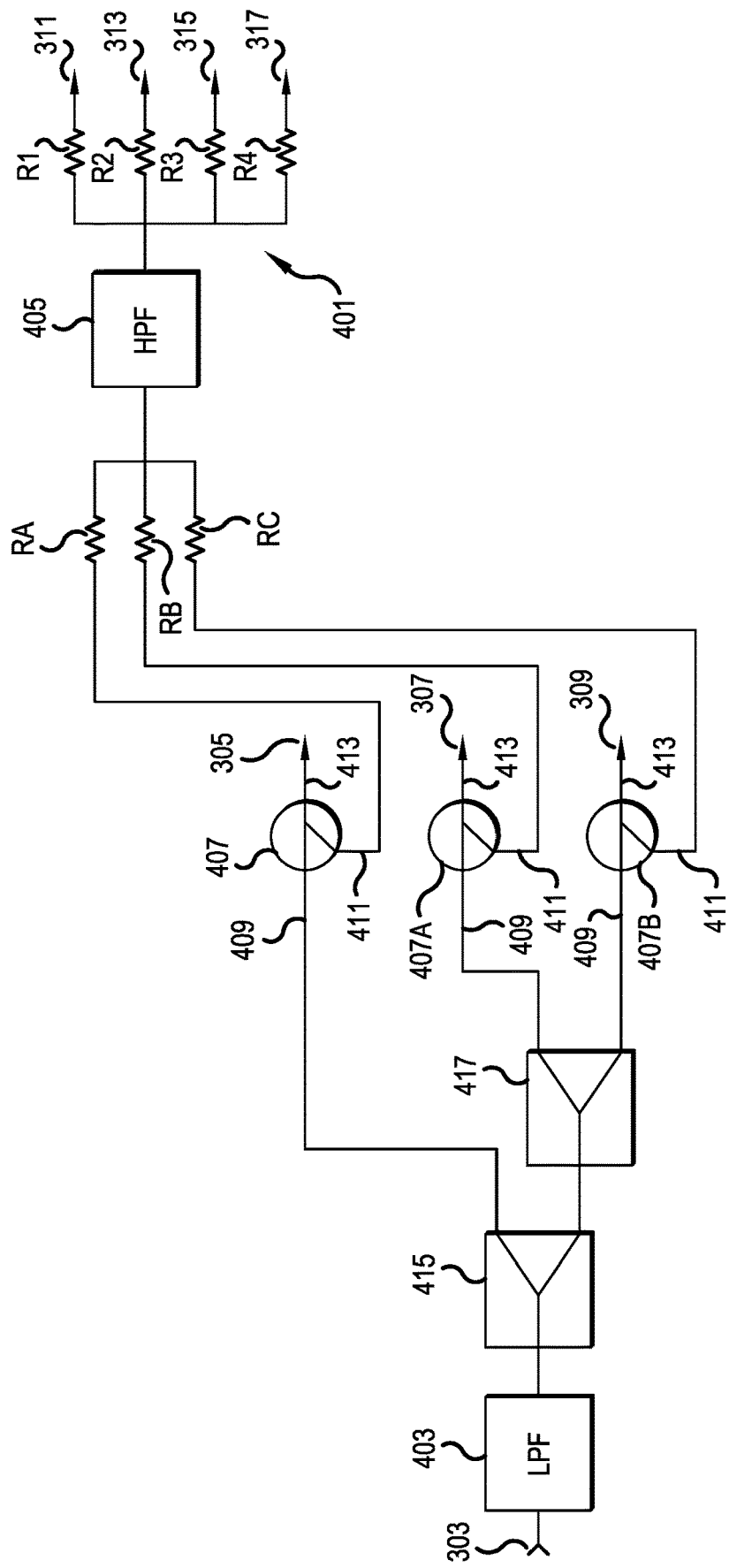
FIG. 11 is a high-level schematic, or block diagram, of a second embodiment of circuitry formed on the at least one PCB within the housing of the POE splitter of FIGS. 4-5.

FIG. 11 shows a high-level schematic, or block diagram, of a second embodiment of circuitry formed on at least one PCB within the housing 301 of the POE splitter 300 of FIGS. 4-5. The same or similar elements have been labeled by the same reference numerals. Similar to the first embodiment, the resistive splitter network 401 is connected to the plurality of second output ports 311, 313, 315 and 317. The MoCA® rejection filter 403 is located between the input port 303 and the plurality of first and second output ports 305, 307, 309, 311, 313, 315 and 317. The MoCA® pass filter 405 is located between the resistive splitter network 401 and the MoCA® rejection filter 403.

In the second embodiment of FIG. 11, the first terminal of the MoCA® rejection filter 403 is directly connected to the input port 303 and the second terminal of the MoCA® rejection filter 403 is directly connected to the input of the first power divider 415. The first output leg of the first power divider 415 is directly connected to the first terminal 409 of the first directional coupler 407. The first directional coupler 407 may be configured to have the same DB losses as described above. The first directional coupler 407 is also configured the same as in FIG. 10, in that the third terminal 413 is directly connected to the first output port 305 of the plurality of first output ports 305, 307 and 309, and the second terminal 411 passes through resistor RA to the MoCA® pass filter 405 and ultimately to the resistive splitter network 401.

The second output leg of the first power divider 415 is directly connected to the input of the second power divider 417. The first output leg of the second power divider 417 is directly connected the first terminal 409 of the second directional coupler 407A. The second terminal 411 of the second directional coupler 407A passes through resistor RB to the MoCA® pass filter 405. The third terminal 413 of the second directional coupler 407A is directly connected to the second output port 307 of the plurality of first output ports 305, 307 and 309.

The second output leg of the second power divider 417 is directly connected to a first terminal 409 of a third directional coupler 407B. The third directional coupler 407B may be configured to have the same DB losses across its terminals, as described above in relation to the first and second directional couplers 407 and 407A. A second terminal 411 of the third directional coupler 407B passes through a resistor RC to the MoCA® pass filter 405. A third terminal 413 of the third directional coupler 407B is directly connected to the third output port 309 of the plurality of first output ports 305, 307 and 309. The resistors RA, RB and RC may have the same resistive values or may be eliminated as discussed above with regard to resistors RA and RB.

Figure 12:
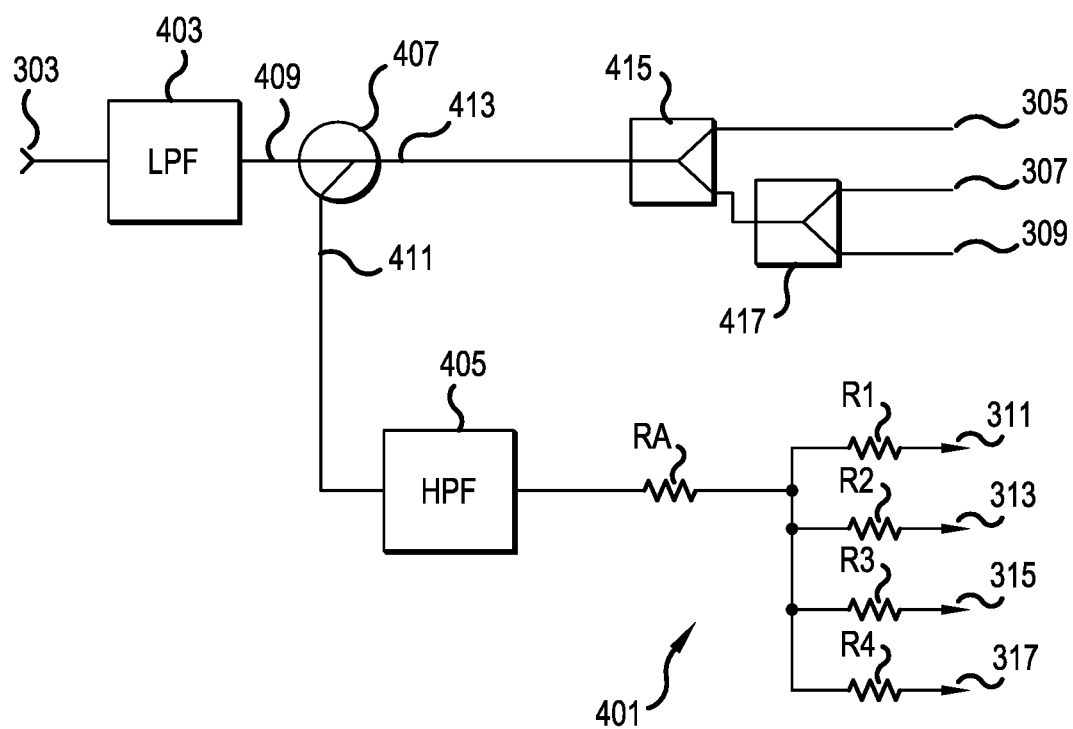
FIG. 12 is a high-level schematic, or block diagram, of a third embodiment of circuitry formed on the at least one PCB within the housing of the POE splitter of FIGS. 4-5.

FIG. 12 shows a high-level schematic, or block diagram, of a third embodiment of circuitry formed on at least one PCB within the housing 301 of the POE splitter 300 of FIGS. 4-5. The same or similar elements have been labeled by the same reference numerals. Similar to the previous embodiments, the resistive splitter network 401 is connected to the plurality of second output ports 311, 313, 315 and 317. The MoCA® rejection filter 403 is located between the input port 303 and the plurality of first and second output ports 305, 307, 309, 311, 313, 315 and 317. The MoCA® pass filter 405 is located between the resistive splitter network 401 and the MoCA® rejection filter 403.

In the third embodiment of FIG. 12, the first terminal of the MoCA® rejection filter 403 is directly connected to the input port 303 and the second terminal of the MoCA® rejection filter 403 is directly connected to the first terminal 409 of the first directional coupler 407. The first directional coupler 407 may be configured to have the same DB losses as described above. The second terminal 411 of the first directional coupler 407 is directly connected to a first terminal of the MoCA® pass filter 405. The second terminal of the MoCA® pass filter 405 is directly connected to a first terminal of resistor RA. The second terminal of the resistor RA is directly connected to the resistive splitter network 401. The values of the resistors RA, R1, R2, R3 and R4 may be selected as described above in connection with the previous embodiments.

The third terminal 413 of the first directional coupler 407 is directly connected to the input of the first power divider 415. The first output leg of the first power divider 415 is directly connected the first output port 305 of the plurality of first output ports 305, 307 and 309. The second output leg of the first power divider 415 is directly connected to the input to the second power divider 417. The first and second output legs of the second power divider 417 are directly connected to the second and third output ports 307 and 309 of the plurality of first output ports 305, 307 and 309, respectively.

Figure 13:
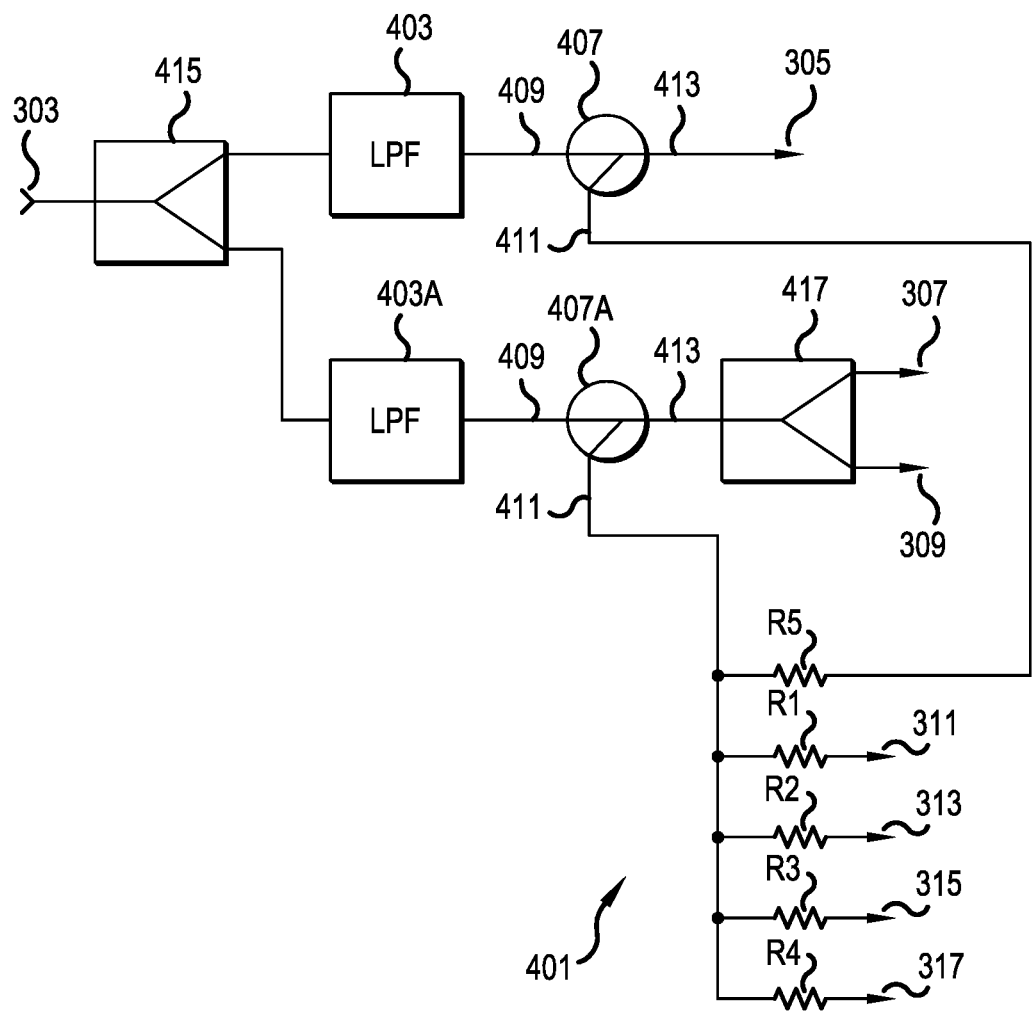
FIG. 13 is a high-level schematic, or block diagram, of a fourth embodiment of circuitry formed on the at least one PCB within the housing of the POE splitter of FIGS. 4-5.

FIG. 13 shows a high-level schematic, or block diagram, of a fourth embodiment of circuitry formed on at least one PCB within the housing 301 of the POE splitter 300 of FIGS. 4-5. The same or similar elements have been labeled by the same reference numerals. Similar to the previous embodiments, the resistive splitter network 401 is connected to the plurality of second output ports 311, 313, 315 and 317. However, instead of a single MoCA® rejection filter 403, the fourth embodiment includes first and second MoCA® rejection filters 403 and 403A.

In the fourth embodiment of FIG. 13, the input port 303 is directly connected to the input of the first power divider 415. The first output leg of the first power divider 415 is directly connected a first terminal of the first MoCA® rejection filter 403. The second output leg of the first power divider 415 is directly connected a first terminal of the second MoCA® rejection filter 403A.

A second terminal of the first MoCA® rejection filter 403 is directly connected to the first terminal 409 of the first directional coupler 407. The first directional coupler 407 may be configured to have the same DB losses as described above. The third terminal 413 of the first directional coupler 407 is directly connected the first output port 305 of the plurality of first output ports 305, 307 and 309. The second terminal 411 of the first directional coupler 407 is directly connected to a resistor R5 within the resistive splitter network 401. The Resistor R5 may be configured the same and have a same resistive value as the resistors R1, R2, R3, and R4 of the resistive splitter network 401.

A second terminal of the second MoCA® rejection filter 403A is directly connected to the first terminal 409 of the second directional coupler 407A. The second directional coupler 407A may be configured to have the same DB losses as described above. The second terminal 411 of the second directional coupler 407A is directly connected to the resistive splitter network 401. The third terminal 413 of the second directional coupler 407A is directly connected to an input of the second power divider 417. The first and second output legs of the second power divider 417 are directly connected to the second and third output ports 307 and 309 of the plurality of first output ports 305, 307 and 309, respectively.

Figure 14:
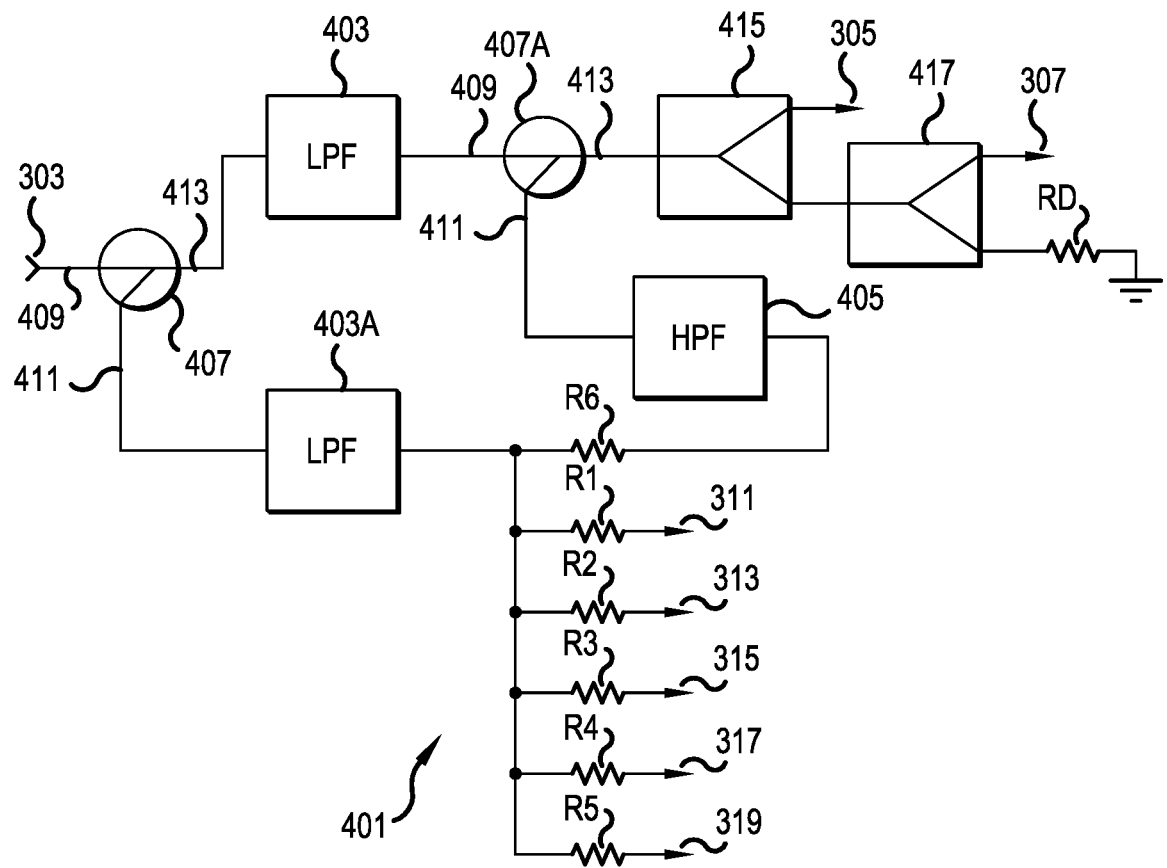
FIG. 14 is a high-level schematic, or block diagram, of a fifth embodiment of circuitry formed on at least one PCB within a housing of a POE splitter having two "MoCA® and CATV" ports" and five "MoCA® only" ports.

FIG. 14 shows a high-level schematic, or block diagram, of a fifth embodiment of circuitry formed on at least one PCB within a housing of a POE splitter. The POE splitter of FIG. 14 includes two "CATV & MoCA®" ports 305 and 307 and five "MoCA® only" ports 311, 313, 315, 317 and 319. The same or similar elements have been labeled by the same reference numerals. Similar to the previous embodiments, the resistive splitter network 401 is connected to the plurality of second output ports 311, 313, 315, 317 and 319. Like the fourth embodiment, the fifth embodiment also includes first and second MoCA® rejection filters 403 and 403A.

In the fifth embodiment of FIG. 14, the input port 303 is directly connected to the first terminal 409 of the first directional coupler 407. The third terminal 413 of the first directional coupler 407 is directly to the first terminal of the first MoCA® rejection filter 403. The second terminal 411 of the first directional coupler 407 is directly connected to the first terminal of the second MoCA® rejection filter 403A.

The second terminal of the second MoCA® rejection filter 403A is directly connected to the resistive splitter network 401. The second terminal of the first MoCA® rejection filter 403 is directly connected to the first terminal 409 of the second directional coupler 407A. The first and second directional couplers 407 and 407A may be configured to have the same DB losses as described above.

The second terminal 411 of the second directional coupler 407A is directly connected to the first terminal of the MoCA® pass filter 405. The second terminal of the MoCA® pass filter 405 is directly connected to a resistor R6 within the resistive splitter network 401. The third terminal 413 of the second directional coupler 407A is directly connected to the input of the first power divider 415.

The first output leg of the first power divider 415 is directly connected the first output port 305 of the plurality of first output ports 305, 307 and 309. The second output leg of the first power divider 415 is directly connected to the input to the second power divider 417. The first output leg of the second power divider 417 is directly connected to the second output port 307 of the plurality of first output ports 305, 307 and 309. The second output leg of the second power divider 417 is directly connected to a resistor RD. Resistor RD terminates the second output leg to ground, and may be formed as a 75 ohm resistor. Alternatively, the second leg of the first power divider 415 may be directly connected to the second output port 307 of the plurality of first output ports 305, 307 and 309, and the second power divider 417 may be eliminated.

The resistive splitter network 401 now has five "MoCA® only" ports 311, 313, 315, 317 and 319. The resistors R5 and R6 may be configured the same and have a same resistive value as the resistors R1, R2, R3, and R4 of the resistive splitter network 401 of previous embodiments.

Figure 15:
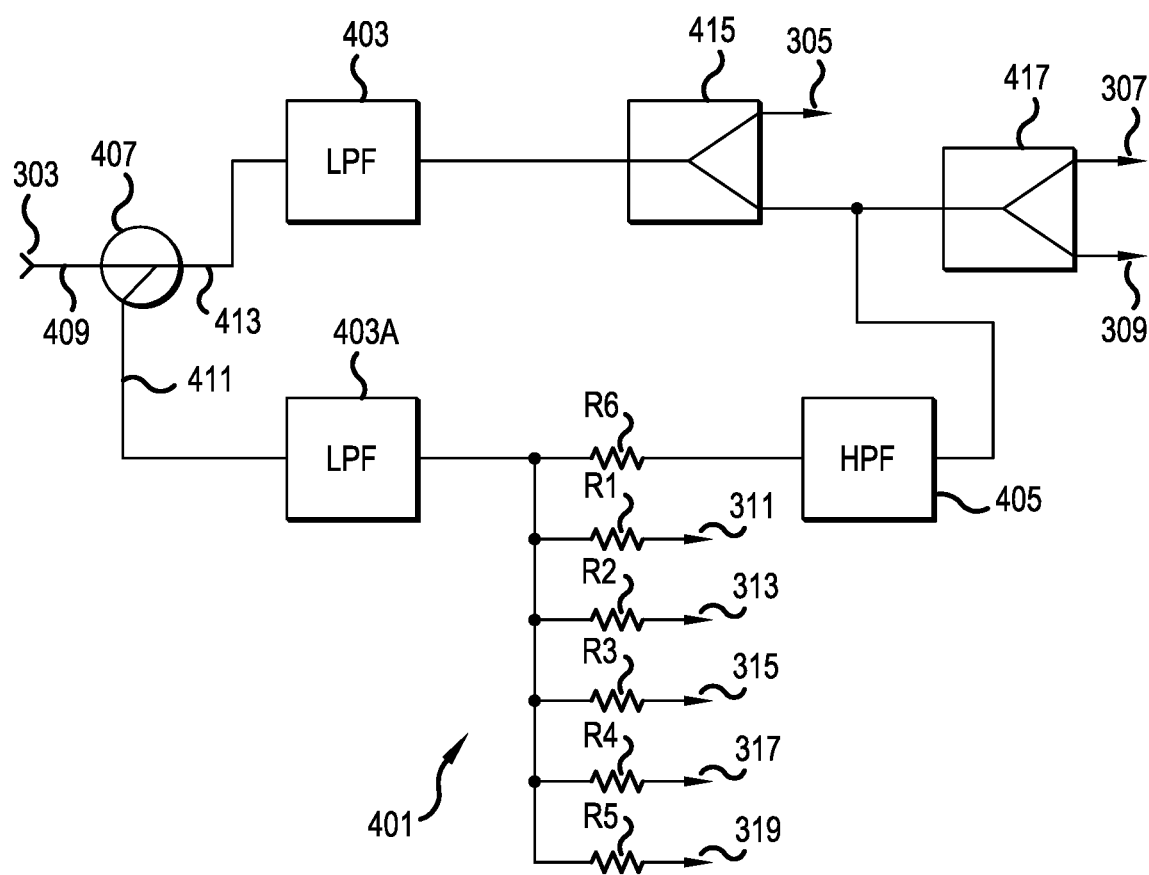
FIG. 15 is a high-level schematic, or block diagram, of a sixth embodiment of circuitry formed on at least one PCB within a housing of a POE splitter having three "MoCA® and CATV" ports" and five "MoCA® only" ports.

FIG. 15 shows a high-level schematic, or block diagram, of a sixth embodiment of circuitry formed on at least one PCB within a housing of a POE splitter. The POE splitter of FIG. 15 includes three "CATV & MoCA®" ports 305, 307 and 309 and five "MoCA® only" ports 311, 313, 315, 317 and 319. The same or similar elements have been labeled by the same reference numerals. Similar to the previous embodiments, the resistive splitter network 401 is connected to the plurality of second output ports 311, 313, 315, 317 and 319. Like the fourth and fifth embodiments, the sixth embodiment also includes first and second MoCA® rejection filters 403 and 403A.

In the sixth embodiment of FIG. 15, the input port 303 is directly connected to the first terminal 409 of the first directional coupler 407. The third terminal 413 of the first directional coupler 407 is directly to the first terminal of the first MoCA® rejection filter 403. The second terminal 411 of the first directional coupler 407 is directly connected to the first terminal of the second MoCA® rejection filter 403A.

The second terminal of the second MoCA® rejection filter 403A is directly connected to the resistive splitter network 401. The second terminal of the first MoCA® rejection filter 403 is directly connected to the input of the first power divider 415. The first output leg of the first power divider 415 is directly connected the first output port 305 of the plurality of first output ports 305, 307 and 309. The second output leg of the first power divider 415 is directly connected to the first terminal of the MoCA® pass filter 405 and to the input of the second power divider 417. The first and second output legs of the second power divider 417 are directly connected to the second and third output ports 307 and 309 of the plurality of first output ports 305, 307 and 309, respectively.

The second terminal of the MoCA® pass filter 405 is directly connected to the resistor R6 within the resistive splitter network 401. The resistive splitter network 401 has five "MoCA® only" ports 311, 313, 315, 317 and 319. The resistors R5 and R6 may be configured the same and have a same value as the resistors R1, R2, R3 and R4 of the resistive splitter network 401 of previous embodiments.

Figure 16:
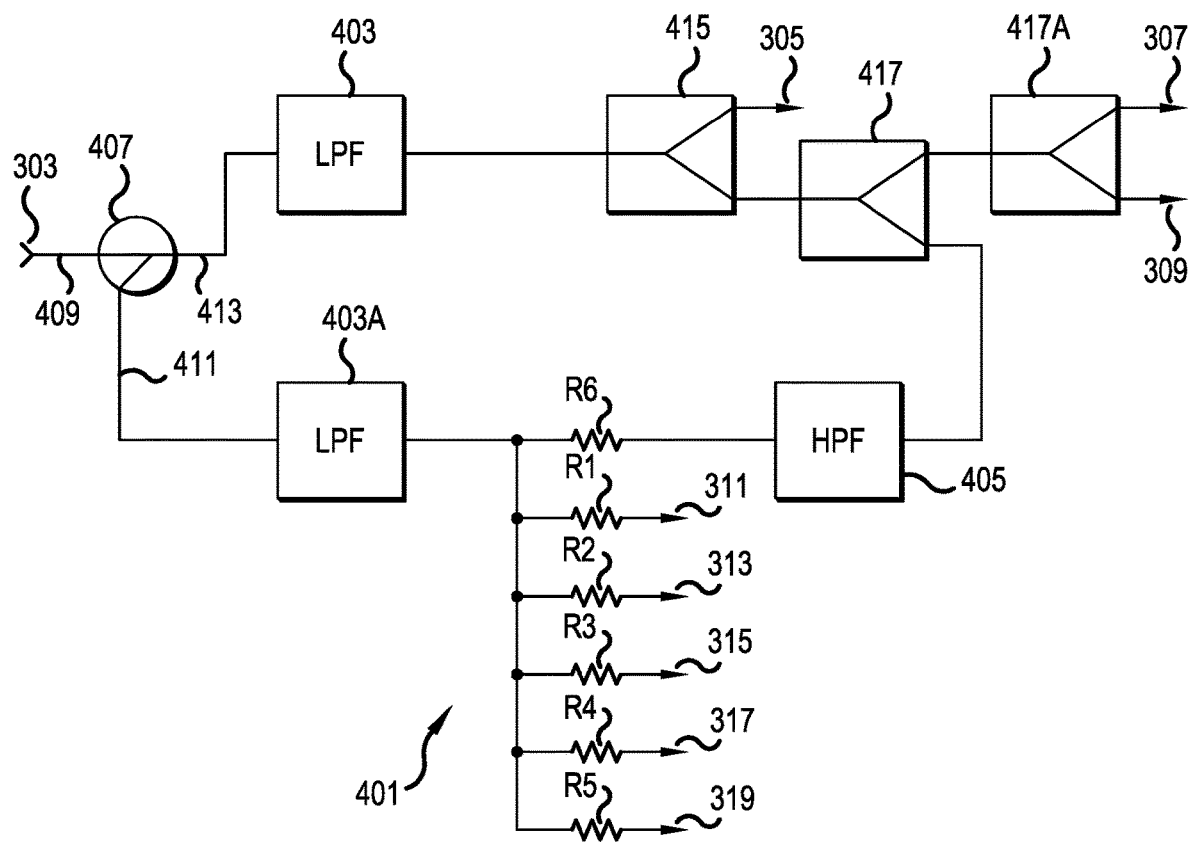
FIG. 16 is a high-level schematic, or block diagram, of a seventh embodiment of circuitry formed on at least one PCB within a housing of a POE splitter having three "MoCA® and CATV" ports" and five "MoCA® only" ports.

FIG. 16 shows a high-level schematic, or block diagram, of a seventh embodiment of circuitry formed on at least one PCB within a housing of a POE splitter. The POE splitter of FIG. 16 includes three "CATV & MoCA®" ports 305, 307 and 309 and five "MoCA® only" ports 311, 313, 315, 317 and 319. The same or similar elements have been labeled by the same reference numerals. Similar to the previous embodiments, the resistive splitter network 401 is connected to the plurality of second output ports 311, 313, 315, 317 and 319. Like the fourth through sixth embodiments, the seventh embodiment also includes first and second MoCA® rejection filters 403 and 403A.

In the seventh embodiment of FIG. 16, the input port 303 is directly connected to the first terminal 409 of the first directional coupler 407. The third terminal 413 of the first directional coupler 407 is directly connected to the first terminal of the first MoCA® rejection filter 403. The second terminal 411 of the first directional coupler 407 is directly connected to the first terminal of the second MoCA® rejection filter 403A.

The second terminal of the second MoCA® rejection filter 403A is directly connected to the resistive splitter network 401. The second terminal of the first MoCA® rejection filter 403 is directly connected to the input of the first power divider 415. The first output leg of the first power divider 415 is directly connected the first output port 305 of the plurality of first output ports 305, 307 and 309. The second output leg of the first power divider 415 is directly connected to the input of the second power divider 417. The first output leg of the second power divider 417 is directly connected to an input of a third power divider 417A. The first and second output legs of the third power divider 417A are directly connected to the second and third output ports 307 and 309 of the plurality of first output ports 305, 307 and 309, respectively.

The second output leg of the second power divider 417 is directly connected to the first terminal of the MoCA® pass filter 405. The second terminal of the MoCA® pass filter 405 is directly connected to the resistor R6 within the resistive splitter network 401. The resistive splitter network 401 has five "MoCA® only" ports 311, 313, 315, 317 and 319. The resistors R5 and R6 may be configured the same and have a same resistive value as the resistors R1, R2, R3 and R4 of the resistive splitter network 401 of previous embodiments.

Figure 17:
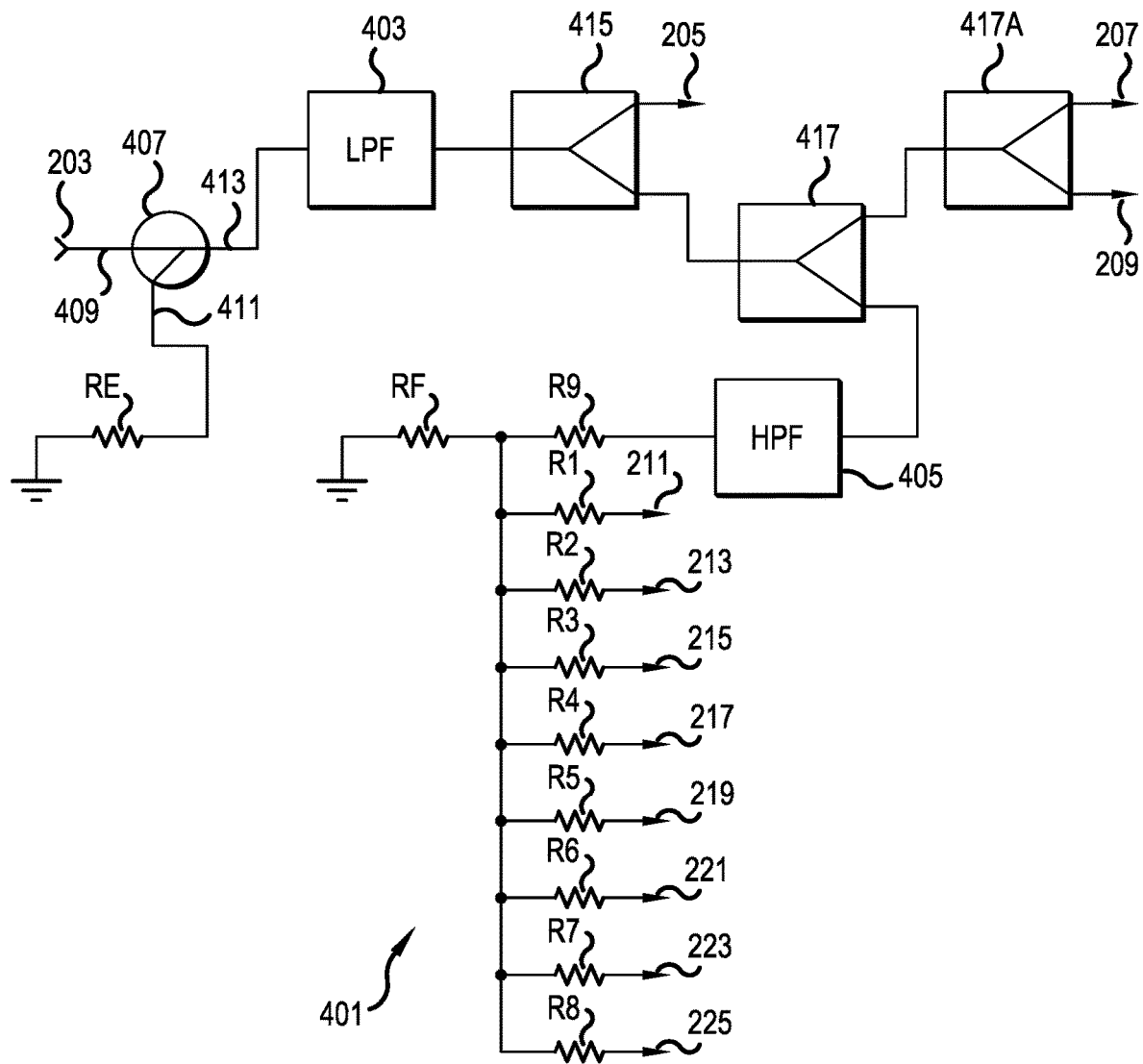
FIG. 17 is a high-level schematic, or block diagram, of a first embodiment of circuitry formed on at least one PCB within the housing of the POE splitter of FIGS. 2-3.

FIG. 17 shows a high-level schematic, or block diagram, of an eighth embodiment of circuitry formed on at least one PCB within the housing 201 of the POE splitter 200 of FIGS. 2-3. The POE splitter of FIG. 17 includes three "CATV & MoCA®" ports 205, 207 and 209 and eight "MoCA® only" ports 211, 213, 215, 217, 219, 221, 223 and 225. The same or similar elements have been labeled by the same reference numerals. Similar to the previous embodiments, the resistive splitter network 401 is connected to the plurality of second output ports 211, 213, 215, 217, 219, 221, 223 and 225.

In the eighth embodiment of FIG. 17, the input port 203 is directly connected to the first terminal 409 of the first directional coupler 407. The third terminal 413 of the first directional coupler 407 is directly connected to the first terminal of the first MoCA® rejection filter 403. The second terminal 411 of the first directional coupler 407 is directly connected to a grounded resistor RE. The grounded resistor RE may have a value like 75 ohms. Alternatively, the input port 203 may be directly connected to the first terminal of the first MoCA® rejection filter 403, and the first directional coupler 407 and grounded resistor RE may be eliminated.

The second terminal of the first MoCA® rejection filter 403 is directly connected to the input of the first power divider 415. The first output leg of the first power divider 415 is directly connected the first output port 205 of the plurality of first output ports 205, 207 and 209. The second output leg of the first power divider 415 is directly connected to the input of the second power divider 417. The first output leg of the second power divider 417 is directly connected to an input of the third power divider 417A. The first and second output legs of the third power divider 417A are directly connected to the second and third output ports 207 and 209 of the plurality of first output ports 205, 207 and 209, respectively.

The second output leg of the second power divider 417 is directly connected to the first terminal of the MoCA® pass filter 405. The second terminal of the MoCA® pass filter 405 is directly connected to a resistor R9 within the resistive splitter network 401. The resistive splitter network 401 has eight "MoCA® only" ports 211, 213, 215, 217, 219, 221, 223 and 225. The resistors R5, R6, R7, R8 and R9 may be configured the same and have a same resistive value as the resistors R1, R2, R3 and R4 of the resistive splitter network 401 of previous embodiments. The resistor RF is optionally included as part of the resistive splitter network 401 and may be useful to balance the resistive splitter network 401 in combination with the other circuitry of FIG. 17, such as in the instance where no connectors are mated to the plurality of second ports 211, 213, 215, 217, 219, 221, 223 and 225. In one embodiment, the resistor RF may be 75 ohms or alternatively configured to match the same value as the resistors R1, R2, R3 and R4.

In the above embodiments, the MoCA® rejection filters 403 and/or 403A may be constructed to reflect MoCA® signals in a direction back toward the plurality of first output ports 205/305, 207/307 and 209/309.

The first, second and/or third power dividers 415, 417 and/or 417A may be constructed in accordance with the Assignee's prior U.S. Pat. No. 8,397,271, which is herein incorporated by reference. Optionally, each of the first, second and/or third power dividers 415, 417 and/or 417A may have a MoCA® bypass filter, which assists in passing MoCA® signals between the first and second output legs of the power divider 415, 417 and/or 417A, as shown in FIGS. 2 and 3 of U.S. Pat. No. 8,397,271. Further, the first, second and/or third power dividers 415, 417 and/or 417A may be configured to divide an input signal 50-50 between the first and second out legs, or alternatively to divide the input signal by other ratios, like 60-40 or 70-30, to pass most of the input signal to a preferred leg, e.g., the first output leg.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A CATV home network splitter device comprising:
 a housing with a top face;
 a female coaxial input port located in a first section of said top face of said housing, said input port for receiving downstream service provider signals and for transmitting upstream signals from customer devices to the service provider;
 at least one first output port located in a second section of said top face of said housing, said at least one first output port for outputting service provider signals to a customer device and for receiving signals directed to the service provider, and said at least one first output port also for transmitting and receiving in-home network signals allowing customer devices within a home network to communicate with each other;

a plurality of second output ports located in a third section of said top face of said housing, said plurality of second output ports for transmitting and receiving in-home network signals allowing customer devices within the home network to communicate with each other, wherein said plurality of second output ports do not output service provider signals to customer devices and do not pass customer device signals to the service provider; and a resistive splitter network connected to said plurality of second output ports, wherein each of said plurality of second output ports can bi-directionally communicate within an in-home network frequency band with said at least one first output port located on said housing, wherein said first section is characterized by a first color or colors, proximate said input port, said second section is characterized by a second color or colors proximate said at least one first output port, and said third section is characterized by a third color or colors proximate said plurality of said second output ports, and wherein said first color or colors are visually distinguishable from said second color or colors and said third color or colors, and wherein said second color or colors are visually distinguishable from said third color or colors.

2. The device according to claim 1, further comprising:
an in-home network pass filter, which passes in-home network frequencies, but attenuates other frequencies, wherein said in-home network pass filter is located between said resistive splitter network and said at least one first output port.

3. The device according to claim 1, wherein said plurality of second output ports includes at least four ports.

4. The device according to claim 1, wherein said at least one first output port includes first, second and third output ports.

5. The device according to claim 1, wherein upstream and downstream signals associated with said service provider signals reside within a frequency band of 5 to 1002 MHz, and wherein said in-home network signals reside within a frequency band of 1125 to 1675 MHz.

6. The device according to claim 1, wherein said first color or colors, second color or colors and third color or colors are part of a label applied to said top face of said housing.

7. The device according to claim 1, wherein each of said input port, said at least one first output port and said plurality of second output ports is formed as a female coaxial port with a pin receiving portion, and further comprising:
dielectric inserts for each of said female coaxial ports, wherein said dielectric insert for said input port has a shade which is visually distinguishable from said dielectric inserts of said at least one first output port and said plurality of second output ports.

8. A CATV home network splitter device comprising:
a housing with a top face;
a female coaxial input port located in a first section of said top face of said housing, said input port for receiving downstream service provider signals and for transmitting upstream signals from customer devices to the service provider;

at least one first output port located in a second section of said top face of said housing, said at least one first output port for outputting service provider signals to a customer device and for receiving signals directed to the service provider, and said at least one first output port also for transmitting and receiving in-home network signals allowing customer devices within a home network to communicate with each other;

a plurality of second output ports located in a third section of said top face of said housing, said plurality of second output ports for transmitting and receiving in-home network signals allowing customer devices within the home network to communicate with each other, wherein said plurality of second output ports do not output service provider signals to customer devices and do not pass customer device signals to the service provider; and a resistive splitter network connected to said plurality of second output ports, wherein each of said plurality of second output ports can bi-directionally communicate within an in-home network frequency band with said at least one first output port located on said housing, wherein said at least one first output port includes first and third female coaxial ports, each having a centrally located pin receiving portion, and wherein said input port is formed as a fourth female coaxial port having a pin receiving portion, and wherein said pin receiving portion of said fourth female coaxial port is located a first distance from said pin receiving portion of said first female coaxial port, and wherein said pin receiving portion of said fourth female coaxial port is located a second distance from said pin receiving portion of said third female coaxial port, and wherein said first distance is approximately equal to said second distance.

9. The device according to claim 8, wherein said first distance is equal to said second distance.

10. The device according to claim 8, wherein said at least one first output port further includes a second female coaxial port having a centrally located pin receiving portion, and wherein said pin receiving portion of said fourth female coaxial port is located a third distance from said pin receiving portion of said second female coaxial port, and wherein said third distance is approximately equal to said first distance.

11. The device according to claim 8, wherein said first section is characterized by a first color or colors, proximate said input port, said second section is characterized by a second color or colors proximate said at least one first output port, and said third section is characterized by a third color or colors proximate said plurality of said second output ports, and wherein said first color or colors are visually distinguishable from said second color or colors and said third color or colors, and wherein said second color or colors are visually distinguishable from said third color or colors.

12. The device according to claim 1, wherein said at least one first output port is a plurality of first output ports, and further comprising:
a single and sole in-home network rejection filter located within said housing between said input port and said pluralities of first and second output ports, which prevents signals of the in-home network from exiting said input port toward the service provider.

13. A passive, CATV home network splitter device comprising:
a housing;
a female coaxial input port located on said housing, said input port for receiving downstream service provider signals and for transmitting upstream signals from customer devices to the service provider;

at least one first output port located on said housing, said at least one first output port for outputting service provider signals to a customer device and for receiving signals directed to the service provider, and said at least one first output port also for transmitting and receiving in-home network signals allowing customer devices within a home network to communicate with each other, said at least one first output port being designated as a CATV and in-home network port;

a plurality of second output ports located on said housing, said plurality of second output ports for transmitting and receiving in-home network signals allowing customer devices within the home network to communicate with each other, wherein said plurality of second output ports do not output service provider signals to customer devices and do not pass customer device signals to the service provider, said plurality of second output ports being designated as in-home network only ports;

a resistive splitter network connected to said plurality of second output ports; and a directional coupler having first, second and third terminals, wherein signals passing between said first and third terminals in either direction encounter a first level of attenuation, signals passing between said second and third terminals encounter a second level of attenuation greater than said first level of attenuation, and signals passing between said first and second terminals encounter a third level of attenuation greater than said second level of attenuation, wherein said first terminal is connected to said input port, said second terminal is connected to said resistive splitter network and said third terminal is connected to said at least one first output port.

14. The device according to claim 13, wherein said at least one first output port is a plurality of first output ports, and wherein said third terminal is connected to two first output ports of said plurality of first output ports.

15. The device according to claim 14, further comprising:
a power divider, wherein said third terminal is connected to an input of said power divider, and first and second output legs of said power divider are connected to respective ones of said two first output ports of said plurality of first output ports.

16. The device according to claim 13, wherein said at least one first output port is a plurality of first output ports, and wherein said directional coupler is a first directional coupler, and further comprising:
a first power divider having an input and first and second output legs, wherein said input is connected to said input port; and
a second directional coupler having first, second and third terminals, wherein signals passing between said first and third terminals in either direction encounter a first level of attenuation, signals passing between said second and third terminals encounter a second level of attenuation greater than said first level of attenuation, and signals passing between said first and second terminals encounter a third level of attenuation greater than said second level of attenuation, wherein said first terminal of said first directional coupler is connected to said first output leg of said first power divider and a first terminal of said second directional coupler is connected to said second output leg of said first power divider.

17. The device according to claim 16, wherein said third terminal of said first directional coupler is coupled a first of said plurality of first output ports, wherein said third terminal of said second directional coupler is coupled a second of said plurality of first output ports, and wherein said second terminals of said first and second directional couplers are connected to resistive splitter network.

18. The device according to claim 17, further comprising:
a second power divider having an input and first and second output legs, wherein said input of said second power divider is connected to said third terminal of said second directional coupler, wherein said first output leg of said second power divider is connected to said second of said plurality of first output ports, and wherein said second output leg of said second power divider is connected to a third of said plurality of first output ports.

* * * * *